United States Patent
Landis et al.

(10) Patent No.: US 12,507,246 B2
(45) Date of Patent: Dec. 23, 2025

(54) UE REPORTING FOR RAKE RECEIVER CONFIGURATION

(71) Applicant: QUALCOMM Incorporated, San Diego, CA (US)

(72) Inventors: Shay Landis, Hod Hasharon (IL); Idan Michael Horn, Hod Hasharon (IL); Valeri Sokolovski, Holon (IL)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 18/350,638

(22) Filed: Jul. 11, 2023

(65) Prior Publication Data

US 2025/0024290 A1    Jan. 16, 2025

(51) Int. Cl.
*H04B 1/7115* (2018.01)
*H04W 8/24* (2009.01)
*H04W 24/10* (2009.01)
*H04W 72/23* (2023.01)
*H04W 84/02* (2009.01)
*H04W 88/02* (2009.01)
*H04W 88/08* (2009.01)
*H04W 92/10* (2009.01)

(52) U.S. Cl.
CPC .......... *H04W 72/23* (2023.01); *H04B 1/7115* (2013.01); *H04W 8/24* (2013.01); *H04W 24/10* (2013.01); *H04W 84/02* (2013.01); *H04W 88/02* (2013.01); *H04W 88/08* (2013.01); *H04W 92/10* (2013.01)

(58) Field of Classification Search
CPC .... G06F 1/32–3296; H04B 1/711–712; H04B 7/02–12; H04B 17/0082–3913; H04B 2201/7097–70979; H04J 11/0023–0066; H04L 5/0001–26; H04W 8/18–245; H04W 24/02–10; H04W 72/02–569; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 2002/0181559 A1* | 12/2002 | Heidari-Bateni | H04B 1/711 |
| 2021/0092723 A1* | 3/2021 | Yerramalli | H04W 72/046 |
| 2021/0329656 A1 | 10/2021 | Landis et al. | |
| 2022/0007365 A1* | 1/2022 | Jung | H04W 8/24 |

OTHER PUBLICATIONS

International Search Report and Written Opinion—PCT/US2024/035750—ISA/EPO—Oct. 16, 2024 (2305499WO).

* cited by examiner

*Primary Examiner* — Timothy J Weidner
(74) *Attorney, Agent, or Firm* — Holland & Hart LLP

(57) ABSTRACT

Methods, systems, and devices for wireless communications are described. The techniques described herein relate to user equipment (UE) reporting for a rake receiver configuration and setting transmission parameters. The UE receives, from a network entity, a request to provide a report indicative of one or more capability parameters associated with a rake receiver of the UE. The UE transmits, to the network entity, the report based on the one or more capability parameters. The UE receives from the network entity, signaling indicating a configuration to be applied to the rake receiver based at least in part on the report.

30 Claims, 15 Drawing Sheets

UE REPORTING FOR RAKE RECEIVER CONFIGURATION

FIELD OF TECHNOLOGY

The following relates to wireless communications, including user equipment reporting for a rake receiver configuration and for setting transmission parameters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communication systems may involve wireless devices, such as a network entity and a UE, communicating over high frequencies. In some examples, the high frequencies may include millimeter-wave (mmWave) and sub-terahertz (THz) frequencies, and these high frequencies may be used for wireless communications due to the large amount of unused or available frequency spectrum at the high frequencies. However, wireless communications over the high frequencies may result in phase noise, which is rapid and random fluctuations in the phase of a signal that may ultimately reduce signal quality. In some cases, to compensate for the phase noise, a receiving device, such as the UE, may include a rake receiver. A rake receiver (e.g., an equalizer) equalizes a channel (e.g., removes distortion of a signal transmitted through the channel), for example, by countering the effects of multiple path (multipath) fading. Multipath fading may occur due to reflection of the transmitted signal that is received at the receiving device. In particular, the rake receiver may use a tap delay line to combine the transmitted signal arriving over multipath components (e.g., multiple signals of the original transmitted signal received at the receiving device). The multipath components are time-delayed versions of the transmitted signal received at the rake receiver, and combining the multipath components improves the signal to noise ratio (SNR) of the signal. A modulation and coding scheme (MCS) and other transmission parameters may be determined for wireless communication in the wireless communication systems based on the equalizing performance of the rake receiver. However, the UE determining the equalization performance of the rake receiver may be difficult or complex, and may often result in large power consumption.

SUMMARY

The described techniques relate to improved methods, systems, devices, and apparatuses that support user equipment (UE) reporting for a rake receiver configuration and for setting transmission parameters. The UE may transmit, to the network entity, a report indicating capability parameters associated with a rake receiver of the UE. The network entity may determine a configuration for the rake receiver based on the report. The network entity may also determine the equalization impact on the channel in order to set the appropriate modulation and coding scheme (MCS) to be used for data transmissions. In some examples, the UE may indicate an overall time domain length of an equalizer, and the network entity may use the time domain length to determine the equalization impact on the channel in order to set the appropriate MCS for wireless communications.

In some examples, the capability parameters may include a specific quantity of sub-receivers of the rake receiver, information regarding power consumption of each of the sub-receivers, a type of the rake receiver, a request for gaps between configurations, or any combination thereof. The network entity determining the configuration for the rake receiver (e.g., quantity of sub-receivers to activate), coefficients for each of the sub-receivers, equalization impact of the configured rake receiver, or the appropriate MCS to be used for wireless communications, may reduce complex processing and power consumption otherwise associated with the UE making these determinations.

A method for wireless communication by a UE is described. The method may include receiving, from a network entity, a request to provide a report indicative of one or more capability parameters associated with a rake receiver of the UE, transmitting, to the network entity, the report based on the one or more capability parameters, and receiving, from the network entity, signaling indicating a configuration to be applied to the rake receiver based on the report.

A UE for wireless communication is described. The UE may include one or more memories storing processor executable code, and one or more processors coupled with the one or more memories. The one or more processors may individually or collectively operable to execute the code to cause the UE to receive, from a network entity, a request to provide a report indicative of one or more capability parameters associated with a rake receiver of the UE, transmit, to the network entity, the report based on the one or more capability parameters, and receive, from the network entity, signaling indicating a configuration to be applied to the rake receiver based on the report.

Another UE for wireless communication is described. The UE may include means for receiving, from a network entity, a request to provide a report indicative of one or more capability parameters associated with a rake receiver of the UE, means for transmitting, to the network entity, the report based on the one or more capability parameters, and means for receiving, from the network entity, signaling indicating a configuration to be applied to the rake receiver based on the report.

A non-transitory computer-readable medium storing code for wireless communication is described. The code may include instructions executable by a processor to receive, from a network entity, a request to provide a report indicative of one or more capability parameters associated with a rake receiver of the UE, transmit, to the network entity, the report based on the one or more capability parameters, and receive, from the network entity, signaling indicating a configuration to be applied to the rake receiver based on the report.

In some examples of the method, UEs, and non-transitory computer-readable medium described herein, the one or more capability parameters may be indicative of a maximum quantity of taps supported by the rake receiver.

In some examples of the method, UEs, and non-transitory computer-readable medium described herein, the one or more capability parameters associated with the rake receiver may include operations, features, means, or instructions for a quantity of sub-receivers of the rake receiver, a type of the rake receiver, a power consumption level associated with each of the sub-receivers, or any combination thereof.

Some examples of the method, UEs, and non-transitory computer-readable medium described herein may further include operations, features, means, or instructions for receiving, from the network entity, an indication of a set of multiple thresholds, each of the set of multiple thresholds associated with activating a respective sub-receiver for a respective channel tap.

In some examples of the method, UEs, and non-transitory computer-readable medium described herein, receiving, from the network entity, the signaling indicating the configuration may include operations, features, means, or instructions for receiving, from the network entity, the configuration in a radio resource control (RRC) signal, a medium access control (MAC) control element (MAC-CE) signal, a downlink control information (DCI) signal, or any combination thereof.

In some examples of the method, UEs, and non-transitory computer-readable medium described herein, receiving, from the network entity, the signaling indicating the configuration may include operations, features, means, or instructions for receiving, from the network entity, the configuration according to a periodic reception pattern or a non-periodic reception pattern.

Some examples of the method, UEs, and non-transitory computer-readable medium described herein may further include operations, features, means, or instructions for measuring, one or more channel response parameters associated with the rake receiver, the channel response parameters based on the configuration applied to the rake receiver, performing a statistical analysis on the one or more channel response parameters, and transmitting, to the network entity, an indication of a post-configuration response based at least part on the statistical analysis on the one or more channel response parameters.

Some examples of the method, UEs, and non-transitory computer-readable medium described herein may further include operations, features, means, or instructions for receiving, from the network entity, signaling indicating a set of multiple coefficients, each of the set of multiple coefficients to be applied to a respective sub-receiver of a set of multiple sub-receivers of the rake receiver.

A method for wireless communication by a network entity is described. The method may include transmitting, to a UE, a request to provide a report indicative of one or more capability parameters associated with a rake receiver of the UE, receiving, from the UE, the report based on the one or more capability parameters, and transmitting, to the UE, signaling indicating a configuration to be applied to the rake receiver based on the report.

A network entity for wireless communication is described. The network entity may include one or more memories storing processor executable code, and one or more processors coupled with the one or more memories. The one or more processors may individually or collectively operable to execute the code to cause the network entity to transmit, to a UE, a request to provide a report indicative of one or more capability parameters associated with a rake receiver of the UE, receive, from the UE, the report based on the one or more capability parameters, and transmit, to the UE, signaling indicating a configuration to be applied to the rake receiver based on the report.

Another network entity for wireless communication is described. The network entity may include means for transmitting, to a UE, a request to provide a report indicative of one or more capability parameters associated with a rake receiver of the UE, means for receiving, from the UE, the report based on the one or more capability parameters, and means for transmitting, to the UE, signaling indicating a configuration to be applied to the rake receiver based on the report.

A non-transitory computer-readable medium storing code for wireless communication is described. The code may include instructions executable by a processor to transmit, to a UE, a request to provide a report indicative of one or more capability parameters associated with a rake receiver of the UE, receive, from the UE, the report based on the one or more capability parameters, and transmit, to the UE, signaling indicating a configuration to be applied to the rake receiver based on the report.

In some examples of the method, network entities, and non-transitory computer-readable medium described herein, the one or more capability parameters may be indicative of a maximum quantity of taps supported by the rake receiver.

In some examples of the method, network entities, and non-transitory computer-readable medium described herein, the one or more capability parameters associated with the rake receiver may include operations, features, means, or instructions for a quantity of sub-receivers of the rake receiver, a type of the rake receiver, a power consumption level associated with each of the sub-receivers, or any combination thereof.

Some examples of the method, network entities, and non-transitory computer-readable medium described herein may further include operations, features, means, or instructions for transmitting, to the UE, an indication of a set of multiple thresholds, each of the set of multiple thresholds associated with activating a respective sub-receiver for a respective channel tap.

In some examples of the method, network entities, and non-transitory computer-readable medium described herein, transmitting, to the UE, the signaling indicating the configuration may include operations, features, means, or instructions for transmitting, from the network entity, the configuration in an RRC signal, a MAC-CE signal, a DCI signal, or any combination thereof.

In some examples of the method, network entities, and non-transitory computer-readable medium described herein, transmitting, to the UE, the configuration may include operations, features, means, or instructions for transmitting, to the UE, the signaling indicating the configuration according to a periodic reception pattern or a non-periodic reception pattern.

Some examples of the method, network entities, and non-transitory computer-readable medium described herein may further include operations, features, means, or instructions for receiving, from the UE, an indication of a post-configuration response based at least part on a statistical analysis on one or more channel response parameters associated with the rake receiver, the channel response parameters based on the configuration applied to the rake receiver.

Some examples of the method, network entities, and non-transitory computer-readable medium described herein may further include operations, features, means, or instructions for transmitting, to the UE, signaling indicating a set of multiple coefficients, each of the set of multiple coefficients to be applied to a respective sub-receiver of a set of multiple sub-receivers of the rake receiver.

DETAILED DESCRIPTION

Figure 1:
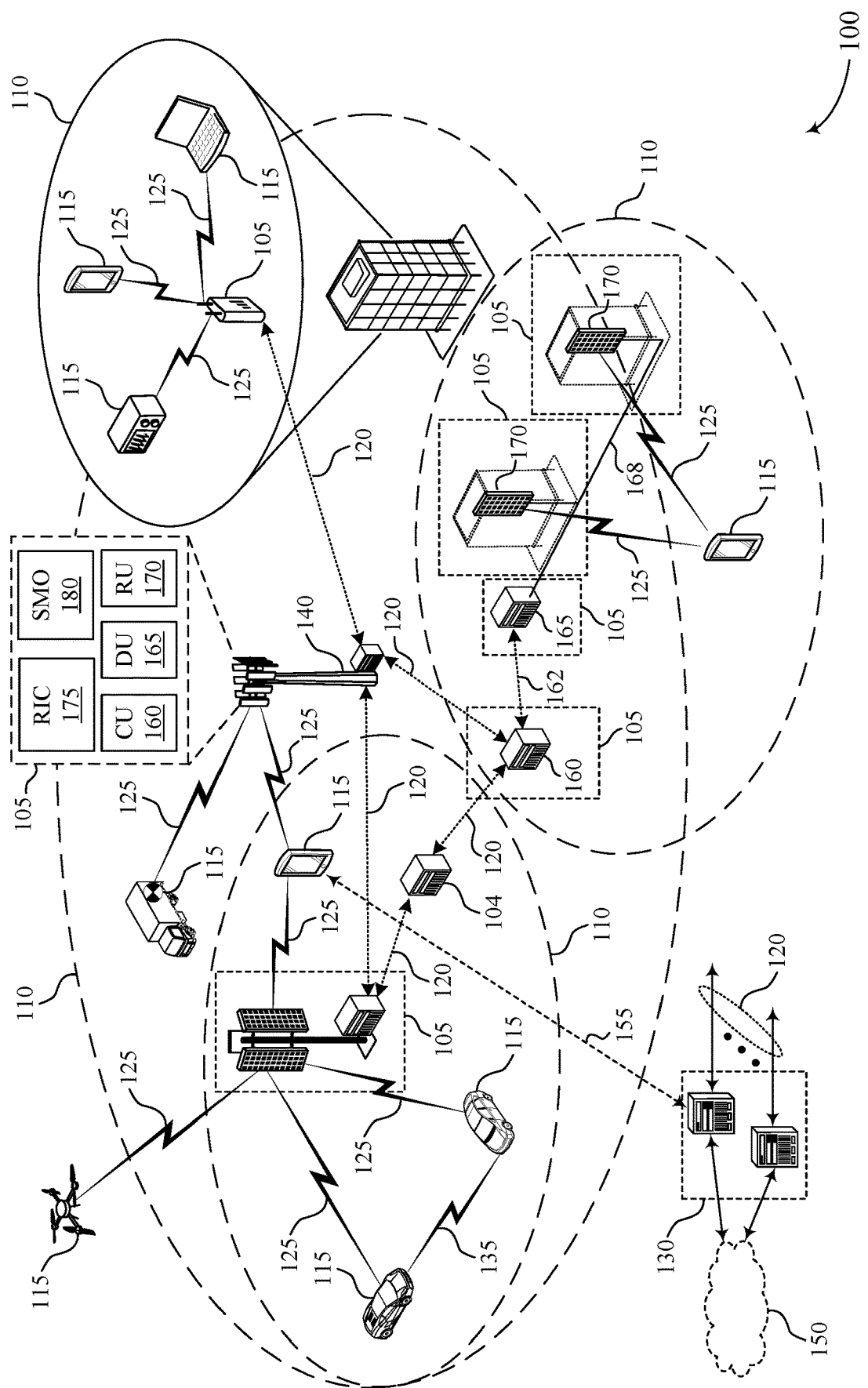
FIG. 1 shows an example of a wireless communications system that supports user equipment (UE) reporting for a rake receiver configuration and setting transmission parameters in accordance with one or more aspects of the present disclosure.

Some wireless communication systems may involve wireless devices, such as a network entity and a user equipment (UE), communicating over high frequencies. In some examples, the high frequencies may include millimeter-wave (mmWave) and sub-terahertz (THz) frequencies, and these high frequencies may be used for wireless communications due to the large amount of unused or available frequency spectrum at the high frequencies. However, wireless communications over the high frequencies may result in phase noise, which is rapid and random fluctuations in the phase of a signal that may ultimately reduce signal quality. In some cases, to compensate for the phase noise, a receiving wireless device, such as the UE, may include a rake receiver. A rake receiver (e.g., equalizer) equalizes a channel (e.g., removes distortion of a signal transmitted through the channel), for example, by countering the effects of multiple path (multipath) fading. Multipath fading may occur due to reflection of a transmitted signal received at the receiving device. In particular, the rake receiver may use a tap delay line to combine a transmitted signal arriving over multipath components (e.g., multiple signals of the original transmitted signal received at the receiving device). The multipath components are time-delayed versions of the transmitted signal received at the rake receiver, and combining the multipath components improves the signal to noise ratio (SNR) of the signal. A modulation and coding scheme (MCS) and other transmission parameters may be determined for data communication in the wireless communication systems based on the equalizing performance of the rake receiver (e.g., an equalizer). However, the UE determining the equalization performance of the rake receiver may be difficult or complex, and may often result in large power consumption.

Aspects of the disclosure are initially described in the context of wireless communications systems. The UE may transmit, to the network entity, an indication of capability parameters associated with a rake receiver of the UE. The network entity may determine a configuration for the rake receiver based on the report. The network entity may also determine the equalization impact of the rake receiver on the channel in order to set the appropriate MCS to be used for wireless communications (e.g., data transmissions). In some examples, the UE may indicate an overall time domain length of an equalizer, and the network entity may use the time domain length to determine the equalization impact on the channel in order to set the appropriate MCS.

In some examples, the capability parameters may include a specific quantity of sub-receivers (e.g., "fingers") of the rake receiver (e.g., per component carrier or as function of a quantity of component carriers and respective bandwidths), information regarding power consumption of each of the sub-receivers, a type of the rake receiver (e.g., fractional delay, integer delay, or resolution of fractional delay), a request for gaps between configurations (e.g., per rank, MCS, quantity of component carriers, and/or bandwidth allocation), or any combination thereof.

In some examples, the network entity may transmit an indication of multiple thresholds that the UE may use to select whether a sub-receiver should be deployed for a respective channel tap. The network entity may also calculate coefficients for each of the sub-receivers. The network entity determining the configuration for the rake receiver (e.g., quantity of sub-receivers to activate), coefficients for each of the sub-receivers, equalization impact of the configured rake receiver, and/or the appropriate MCS to be used for wireless communications, may reduce complexity and power consumption otherwise associated with the UE making these determinations. Aspects of the disclosure are further illustrated by and described with reference to apparatus diagrams, system diagrams, and flowcharts that relate to UE reporting for a rake receiver configuration and for setting transmission parameters.

FIG. 1 shows an example of a wireless communications system 100 that supports UE reporting for a rake receiver configuration and setting transmission parameters in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support UE 115 reporting for a rake receiver configuration and setting transmission parameters as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the TD) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the TD) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may include communications over high frequency bands, where frequency spectrum is abundant. The high frequencies may include millimeter-wave (mmWave) (e.g., frequency range 2 (FR2) frequencies) and sub-terahertz (THz) frequencies (e.g., frequency range 4 (FR4) and frequency range 5 (FR5)). These high frequencies may be used for wireless communications due to the large amount of unused or available frequency spectrum at the high frequencies. Wireless communications over the high frequencies may result in phase noise. To reduce the impact of phase noise, a single carrier waveform may be used (e.g., such as for the subTHz waveform). For example, a 5G uplink waveform may be used, and the 5G uplink waveform may involve a Discrete Fourier Transform-Spread-Orthogonal Frequency Division Multiplexing (DFT-s-OFDM) transmission scheme. The DFT-s-OFDM scheme may facilitate in resolving for the phase noise using a time domain phase tracking reference signal (PT-RS). Using PT-RS may provide frequency domain (FD) equalization, but may also result in complex processing since additional inverse Discrete Fourier Transform (IDFT) or Discrete Fourier Transform (DFT) precoding is performed for uplink or downlink processing. In some examples, to avoid the DFT precoding while using a single carrier waveform, a rake receiver may be used as the equalizer.

In some examples, the UE 115 may include a rake receiver to equalize a channel. That is, the rake receiver may remove distortion of a signal transmitted through a channel and received at the UE 115. Based on the equalization impact (e.g., distortion removed and improved SNR), the network may set MCS and other transmission parameters for wireless communications. However, the UE 115 determining the equalization performance of the rake receiver may be difficult or complex, and may often result in large power consumption at the UE 115.

As discussed herein, the UE 115 may transmit, to the network entity 105, a report indicating capability parameters associated with a rake receiver of the UE 115. The network entity 105 may determine a configuration for the rake receiver based on the report. The network entity 105 may also determine the equalization impact of the configured rake receiver in order to set the appropriate MCS to be used for data transmissions. In some examples, the UE 105 may indicate an overall time domain length of the equalizer, and the network entity 105 may use the time domain length to determine the equalization impact on the channel in order to set the appropriate MCS.

In some examples, the capability parameters indicated in the report may include a specific quantity of sub-receivers (e.g., "fingers") of the rake receiver (e.g., per component carrier or as function of a quantity of component carriers and respective bandwidths), information regarding power consumption of each of the sub-receivers, a type of the rake receiver (e.g., fractional delays, integer delays, or resolution of fractional delays), a request for gaps between configurations (e.g., per rank, MCS, quantity of component carriers, and/or bandwidth allocation), or any combination thereof.

In some examples, the network entity 105 may transmit an indication of multiple thresholds that the UE 115 may use to select whether a sub-receiver should be deployed for a respective channel tap. The network entity 105 may also calculate coefficients for each of the sub-receivers. The network entity 105 determining the configuration for the rake receiver (e.g., quantity of sub-receivers to activate), coefficients for each of the sub-receivers, equalization impact of the configured rake receiver, and/or the appropriate MCS to be used for data transmissions, may reduce complexity and power consumption otherwise associated with the UE 115 making these determinations.

Figure 2:
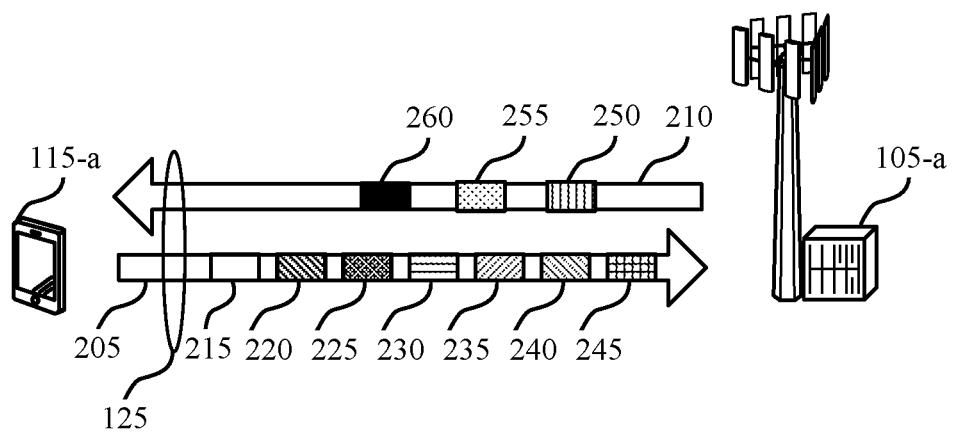
FIG. 2 shows an example of a wireless communications system that supports UE reporting for a rake receiver configuration and setting transmission parameters in accordance with one or more aspects of the present disclosure.

FIG. 2 shows an example of a wireless communications system 200 that supports UE reporting for a rake receiver configuration and for setting transmission parameters in accordance with one or more aspects of the present disclosure. The wireless communications system 200 may implement aspects of or may be implemented by aspects of the wireless communications system 100. For example, the wireless communications system 200 includes a UE 115-a, which may be an example of a UE 115 described herein with respect to FIG. 1. The wireless communications system 200 also includes a network entity 105-a, which may be an example of a network entity 105 as described herein with respect to FIG. 1.

The network entity 105-a may communicate with the UE 115-a using a communication link 125. The communication link 125 may be an example of an NR or LTE link between the UE 115-a and the network entity 105-a. The communication link 125 may include a bi-directional link that enables both uplink and downlink communications. For example, the UE 115-a may transmit uplink signals 205 (e.g., uplink transmissions), such as uplink control signals or uplink data signals, to the network entity 105-a using the communication link 125 and the network entity 105-a may transmit downlink signals 210 (e.g., downlink transmissions), such as downlink control signals or downlink data signals, to the UE 115-a using the communication link 125. Although the following descriptions describe multiple individual signals, for example, for the UE 115-a to indicate various rake receiver-related parameters, the techniques described herein may include one or more signals that are transmitted from the UE 115-a to indicate a single report that includes information for all parameters.

In some examples, the UE 115-a may transmit signaling, to the network entity 105-a, indicating a length of the UE's 115-a equalizer 215 in the time domain since the length of the equalizer may impact performance of the equalizer. The network entity 105-a may use the indicated length of the equalizer to determine the impact on performance and to set the appropriate MCS or related parameters for wireless communications with the UE 115-a. In some examples, the ULE 115-a may include a rake receiver as an equalizer. In such examples, the UE 115-a may transmit signaling indicating a quantity of sub-receivers 220 (e.g., "fingers") of the rake receiver that the UE 115-a may support. The network entity 105-a may use this information to further and more accurately determine the MCS and other transmission-related parameters.

The UE 115-a may also transmit signaling indicating power consumption 225 for each finger configuration. In some examples, the UE 115-a may also transmit signaling indicating additional information regarding the quantity of fingers with respect to a quantity of activated component carriers (CC) and the corresponding bandwidth. The network entity 105 may use this information to increase throughput and reduce power consumption at the UE 115-a. The UE 115-a may transmit signaling indicating a type of the rake receiver 230, such as a fractional delay supporting rake receiver (e.g., fractional delay type) or an integer delay supporting rake receiver (e.g., integer delay type). In some examples, the signaling indicating the type of the rake receiver 230 (or in another signaling) may also indicate the difference in a quantity of taps that the rake receiver may support for the fractional delay type and the integer delay type. In some examples, the UE 115-a may transmit signaling indicating the impact on power consumption of the UE 115-a when using the fractional delay type, the integer delay type, or a comparison of power consumption for the fractional delay and integer delay types.

In some examples, the UE 115-a may transmit signaling indicating a power consumption detail 235. The power consumption details may include power consumption at different working points of the rake receiver or another measurable point of the rake receiver, such as at a battery (e.g., multidimensional aptitude battery (MAB)). The UE 115-a may transmit signaling indicating gaps 240 between each configuration per rank, MCS, a quantity of CC, or bandwidth correlation. In some examples, the UE 115-a may transmit signaling indicating a post-configuration response 245. The post-configuration response may indicate whether a configuration for the rake receiver is acceptable (e.g., performing or providing equalization or SNR above a threshold) or not acceptable (e.g., below the threshold). In such examples, the network entity 105-a may provide a new configuration when the performance is not acceptable. The configuration may be based on parameters indicated by the UE 115-a. In some examples, the configuration may be based on a decoding being above a decoding threshold (e.g., for each finger that may assigned to different multipath components).

The network entity 105-a may transmit signaling indicating a vector of bits 250. The vector of bits may represent a quantity of fingers to use in equalization with delays or without delays. The network entity 105 may also transmit signaling indicating multiple thresholds 255 for the multiple fingers. The UE 115-a may use the multiple thresholds to determine whether or not deploy the respective finger for the channel tap. In some examples, the network entity 105-a may transmit signaling indicating finger coefficients 260. That is, the network entity 105-a may calculate finger coefficients based on information provided to the network entity 105-a from the UE 115-a, rather than the UE 115-a determining the coefficients. The finger coefficients are based on the power or the SNR from each correlator output of each finger. Determining the coefficients may involve a complex process that consumes a large amount of power at the UE 115. Accordingly, the network entity 105-a may reduce complex processing and power consumption at the UE 115-a by performing the processes for determining the finger coefficients.

Figure 3:
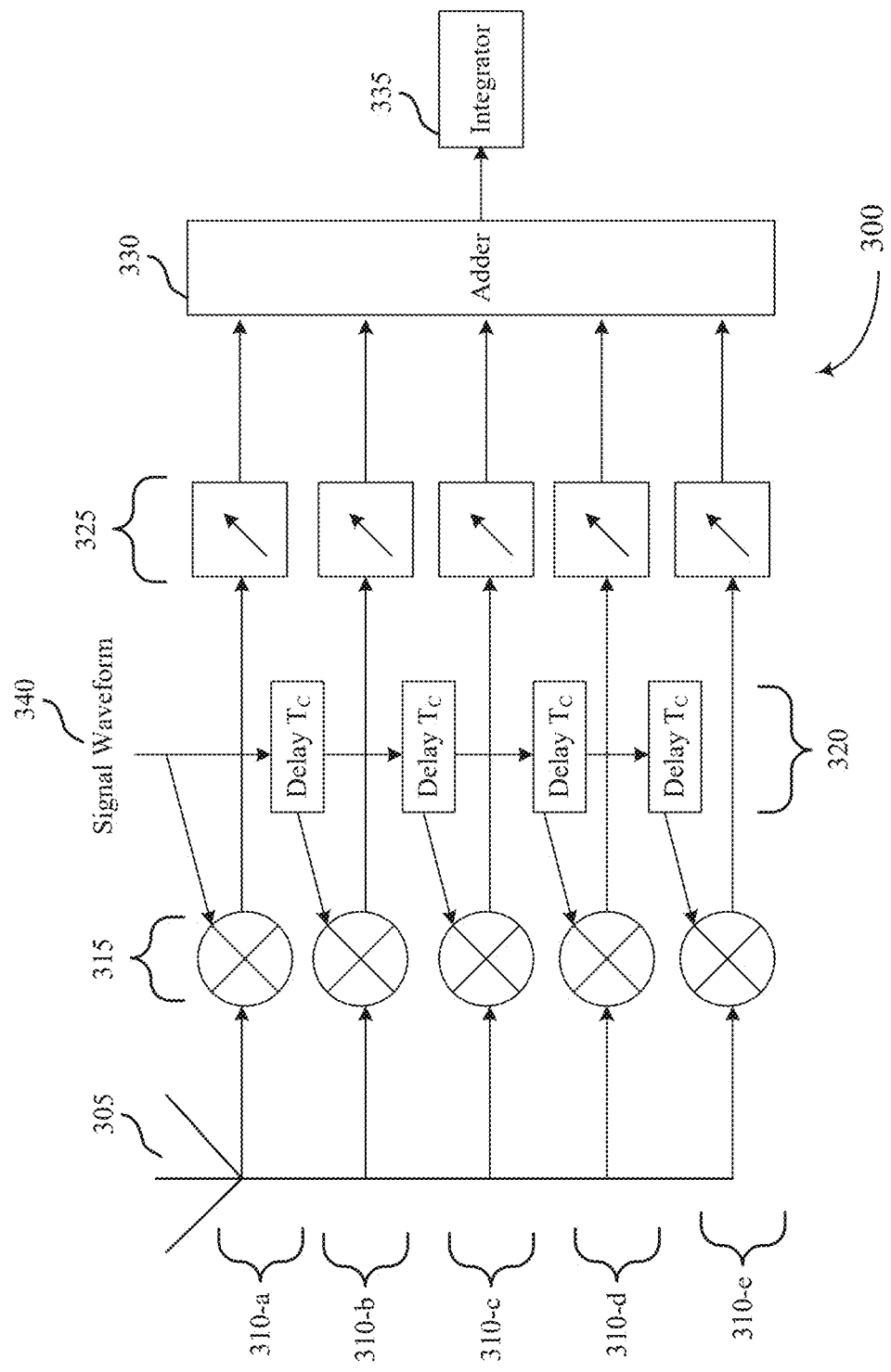
FIG. 3 shows an example of a rake receiver that supports UE reporting for a rake receiver configuration and setting transmission parameters in accordance with one or more aspects of the present disclosure.

FIG. 3 shows an example of a rake receiver 300 that supports UE reporting for a rake receiver configuration and for setting transmission parameters in accordance with one or more aspects of the present disclosure. Although the depicted rake receiver 300 includes five fingers, the techniques described herein with respect to the rake receiver 300 may include one or more fingers.

The rake receiver 300 is a radio receiver designed to counter the effects of multipath fading. Multiple sub-receivers, referred to as "fingers," are correlators that are assigned to multipath components. Each finger may individually and independently decode a single multipath component. The contribution of the fingers may be combined or "raked" in order to utilize the different transmission characteristics of each path to recover the original transmitted signal. Rake receivers may be common in various code-division multiple access (CDMA) and wideband CDMA (WCDMA) radio devices, such as mobile phones or other UEs 115. The rake receiver 300 may be used for subTHz receivers due to a small quantity of reflections (e.g., taps), low processing complexities, large bandwidth for a single carrier, and low power consumption.

The rake receiver 300 may include an antenna 305, at which a transmitted signal is received. The transmitted signal may pass through a quantity of multipath components, resulting in multiple signals that are delayed versions of the original transmitted signal. The multiple signals may pass through different fingers 310, and each of the multiple signals may be associated with different phases, amplitudes, delays, magnitudes, or time-of-arrivals at the receiver device (e.g., UE 115). The multiple fingers 310 may include a first finger 310-a, a second finger 310-b, a third finger 310-c, a fourth finger 310-d, and a fifth finger 310-e. Each of the fingers 310 are sub-receivers of the rake receiver 300, and each of the fingers 310 may individually and independently decode a single multipath component.

For example, each of the fingers 310 includes a respective correlator 315. Each of the correlators 315 provide a different amount of delay to the signal received at the respective finger 310. The correlators 315 may be used to separately detect M, the strongest multipath components. That is, each correlator 315 may detect a version of the original transmitted signal (e.g., that is delayed, inverted, etc.), and each finger 310 correlates to a portion of the transmitted signal that is delayed with respect to the other fingers 310. The outputs of each correlator 315 may be weighted by applying weighting coefficients in order to provide an accurate estimate of the transmitted signal (e.g., to provide a linear combination of the correlator output). For example, demodulation and bit decisions may be based on the weighted outputs of the correlators 315. In some examples, weighting coefficients applied to the correlators 315 may be based on the power or the SNR from the output of each correlator 315. For example, if the power or SNR is small from a particular correlator 315, then the weighting coefficient may be small.

The multiple signals of each of the fingers 310 may be correlated at the respective correlators 315 with the signal waveform 340. Each of the fingers 310 may include a respective, independent delay 320 (Delay Tc). Attenuators 325 may also be applied to each of the multiple signals of the transmitted signal that passes through respective fingers 310. The attenuators 325 may correspond to weighting factors. The outputs from each of the fingers 310 are combined at an adder 330 and provided to an integrator 335 to integrate the results into a received signal. Accordingly, the rake receiver 300 may collect the time-shifted versions of the original transmitted signal by providing a separate correlation receiver for each of the multipath signals. The rake receiver 300 may use several correlators 315 to individually process several signal multipath components, and the outputs are combined (e.g., maximal-ratio combining (MRC)) or "raked" together to improve information reliability with respect to the original transmitted signal.

Figure 4:
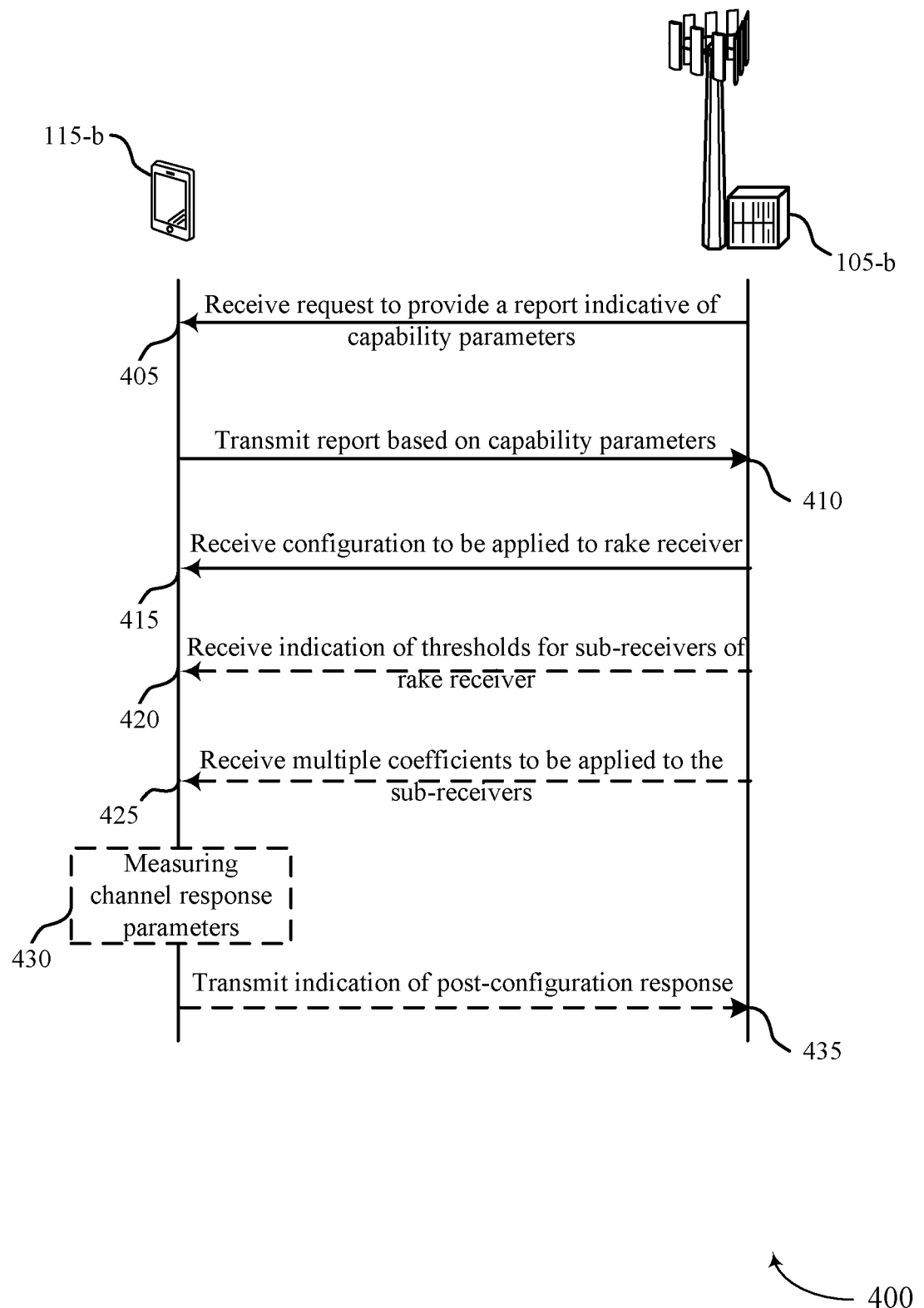
FIG. 4 shows an example of a process flow that supports UE reporting for a rake receiver configuration and setting transmission parameters in accordance with one or more aspects of the present disclosure.

FIG. 4 shows an example of a process flow 400 that supports UE reporting for a rake receiver configuration and for setting transmission parameters in accordance with one or more aspects of the present disclosure. The process flow 400 may implement aspects of or may be implemented by aspects of the wireless communications system 100 or the wireless communications system 200. For example, the process flow 400 may include a UE 115-b, which may be an example of a UE 115 as described herein. The process flow 400 may include a network entity 105-b, which may be an example of a network entity 105 as described herein. In the following description of the process flow 400, the operations performed by the network entity 105-b and the UE 115-b may be performed in different orders or at different times than the exemplary order shown. Some operations may also be omitted from the process flow 400, or other operations may be added to the process flow 400. Further, while operations in the process flow 400 are illustrated as being performed by the network entity 105-b and the UE 115-b, the examples herein are not to be construed as limiting, as the described features may be associated with any quantity of different devices.

At 405, the UE 115-b may receive, from the network entity 105-b, a request to provide a report indicative of one or more capability parameters associated with a rake receiver of the UE 115-b. For At 410, the UE 115-b may transmit a report based on capability parameters. In some examples, the one or more capability parameters may be indicative of a maximum quantity of taps supported by the rake receiver. In some examples, the one or more capability parameters may include a quantity of fingers (e.g., sub-receivers) of the rake receiver, a type of the rake receiver, a power consumption level associated with each of the fingers, or any combination thereof. The quantity of fingers may be provided as a function of CC or as a function CC bandwidth. The type of rake receiver may include an integer delay type, a fractional delay type, or a resolution of fractional delays. The power consumption level may include a power level, a threshold, or both, that are associated with one or more of the fingers, different rake receiver working points, or other measurable points of the rake receiver or the UE 115-b. The network entity 105-b may provide configurations for greater throughput or power (e.g., lowest watts per bits). Providing power consumption details for the fingers may facilitate the network entity 105-b in selecting a rake receiver type configuration (e.g., fractional delay or integer delay type), as well as reduce complex processing otherwise performed at the UE 115-b. In some examples, the report may include a requested gap between each configuration per rank, MCS, a quantity of CCs, bandwidth allocations, or any combination thereof.

Once the UE 115-b is in a connected mode (e.g., when signals are communicated to or from the UE 115-b), the network entity 105-b may transmit one or more configurations to the UE 115-b. At 415, the UE 115-b may receive a configuration to be applied to the rake receiver. In some examples, signaling indicating the configuration may include radio resource control (RRC) signaling, a medium access control (MAC) control element (MAC-CE) signaling, a downlink control information (DCI) signaling, or any combination thereof. In some examples, the network entity 105-b may transmit the signaling in a periodic pattern, a non-periodic pattern, or a combination thereof.

The configuration may include a vector of bits (e.g., a 0 or a 1) that represent the individual fingers or quantity of fingers to use in equalization, with or without respective delays. The vector may indicate the weighting coefficients, which are based on the power or the SNR from each correlator output, as discussed with respect to FIG. 3.

The vector may be compressed, for example, based on differentiating adjacent values or according to a coherence bandwidth. Adjacent CCs may be strongly correlated and have similar channel characteristics resulting in the differentiating vector having many zeros, which may be efficiently compressed (e.g., using a Huffman compression). In some examples, the vector of bits report may have another differentiating vector with respect to another report or the last report to reduce the nonzero values, allowing for further compression.

In some examples, at 420, the UE 115-*b* may receive an indication of multiple thresholds. Each of the multiple thresholds may be associated with activating or deploying a respective finger of the rake receiver for a respective channel tap. In some examples, at 425, the UE 115-*b* may receive an indication of multiple coefficients (e.g., weighting coefficients). Each of the multiple coefficients may be applied to a respective finger of multiple fingers of the rake receiver, as discussed with respect to FIG. 3.

In some examples, at 430, the UE 115-*b* may measure one or more channel response parameters associated with the rake receiver. The channel response parameters may be based on the configuration applied to the rake receiver. The UE 115-*b* may perform a statistical analysis on the one or more channel response parameters and then at 435, transmit an indication of a post-configuration response. The post-configuration response may be based on the statistical analysis on the one or more channel response parameters. The network entity 105-*b* may provide a new configuration based on the post-configuration response. The network entity 105-*b* determining one or more configurations for the rake receiver, coefficients for each of the sub-receivers, equalization impact of the configured rake receiver, or the appropriate MCS to be used for wireless communications, may reduce complex processing and power consumption otherwise associated with the UE 115-*b* making these determinations.

Figure 5:
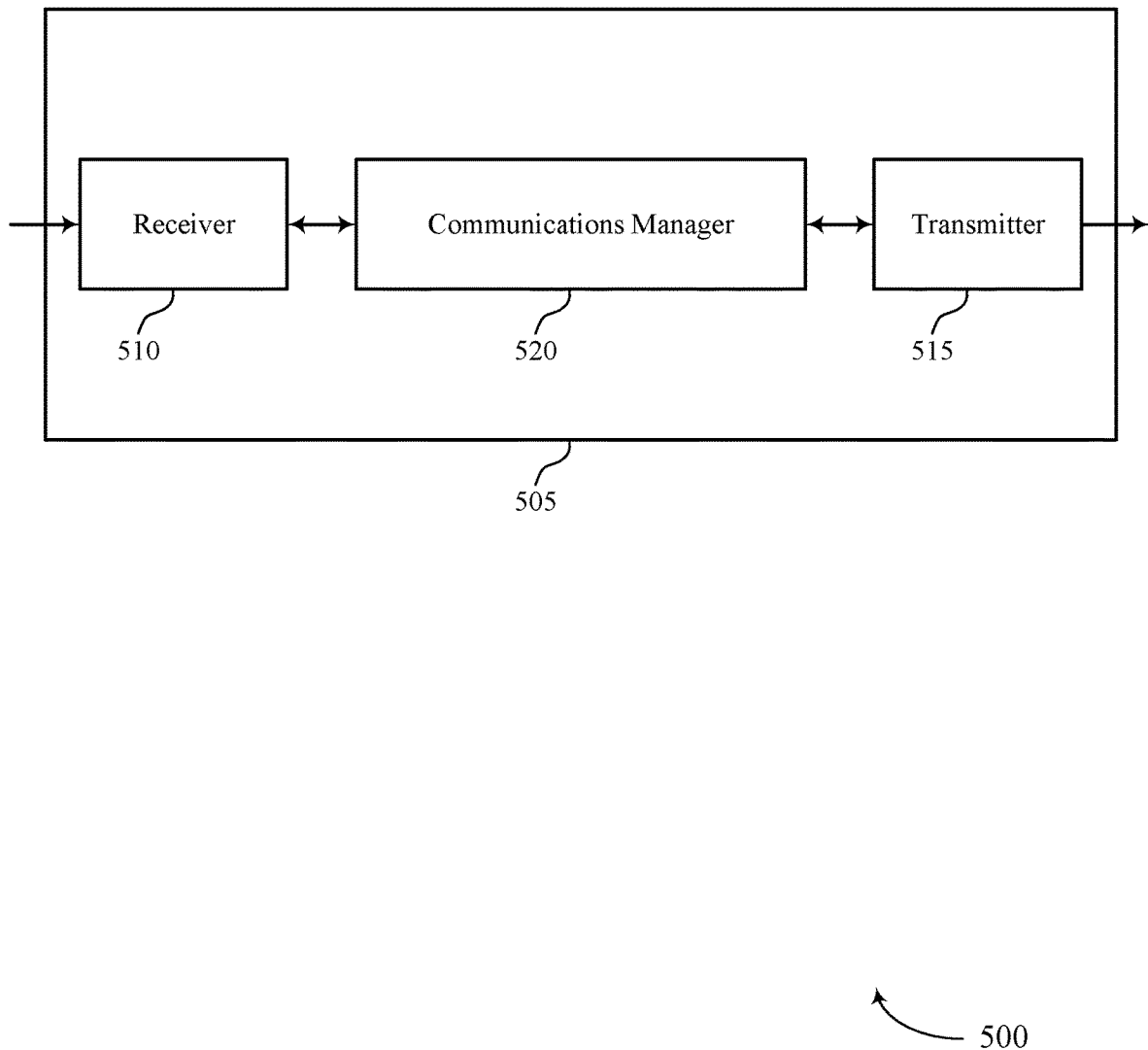
FIGS. 5 and 6 show block diagrams of devices that support UE reporting for a rake receiver configuration and setting transmission parameters in accordance with one or more aspects of the present disclosure.

FIG. 5 shows a block diagram 500 of a device 505 that supports UE reporting for a rake receiver configuration and setting transmission parameters in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor (not shown), which may be coupled with at least one memory (not shown), to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to UE reporting for a rake receiver configuration and setting transmission parameters). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE reporting for a rake receiver configuration and setting transmission parameters). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of UE reporting for a rake receiver configuration and setting transmission parameters as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving, from a network entity, a request to provide a report indicative of one or more capability parameters associated with a rake receiver of the UE. The communications manager 520 is capable of, configured to, or operable to support a means for transmitting, to the network entity, the report based on the one or more capability parameters. The communications manager 520 is capable of, configured to, or operable to support a means for receiving, from the network entity, signaling indicating a configuration to be applied to the rake receiver based on the report.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reducing complex processing performed at the UE 115 in order to reduce power consumption at the UE 115.

Figure 6:
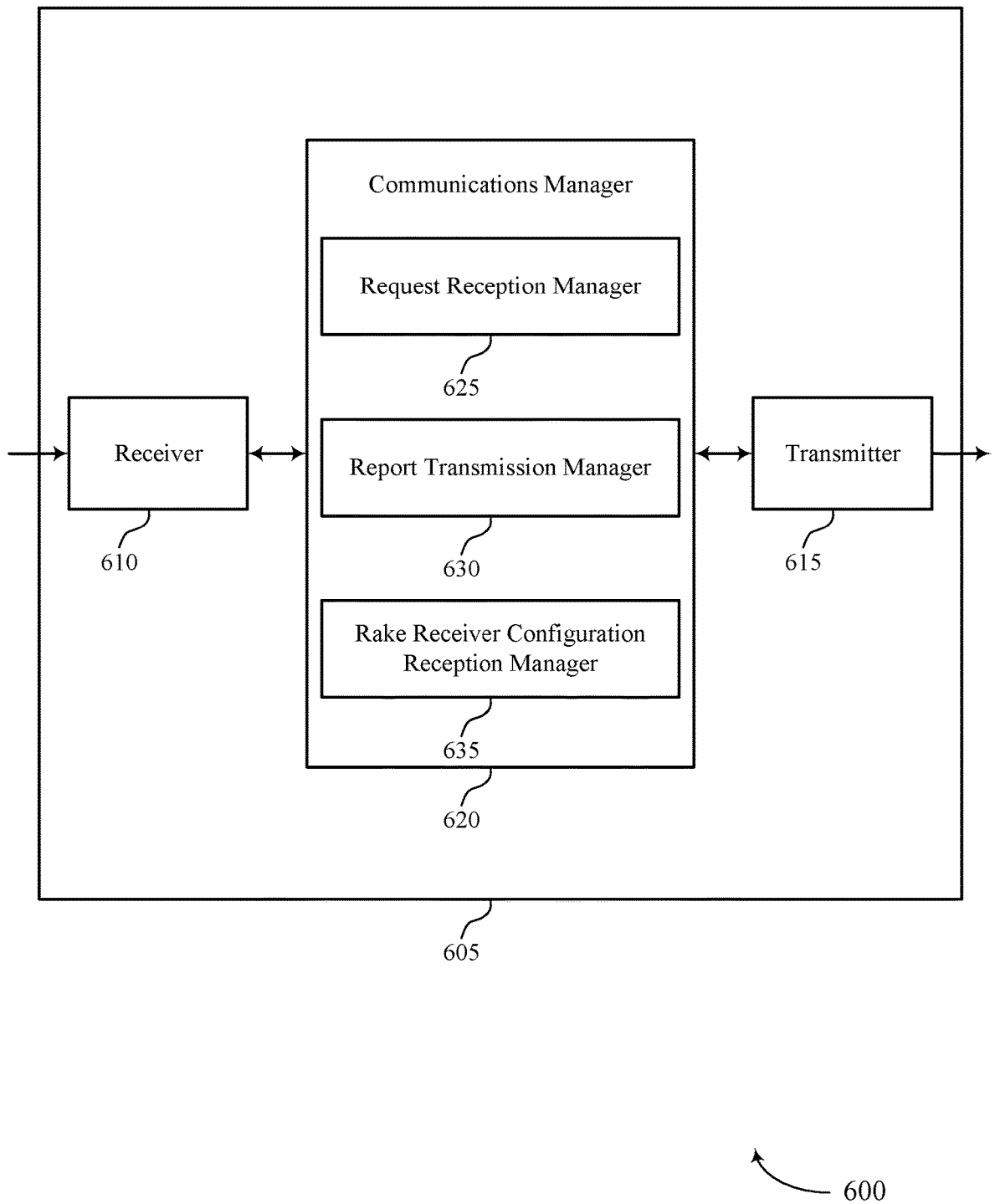

FIG. 6 shows a block diagram 600 of a device 605 that supports UE reporting for a rake receiver configuration and setting transmission parameters in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor (not shown), which may be coupled with at least one memory (not shown), to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to UE reporting for a rake receiver configuration and setting transmission parameters). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE reporting for a rake receiver configuration and setting transmission parameters). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of UE reporting for a rake receiver configuration and setting transmission parameters as described herein. For example, the communications manager 620 may include a request reception manager 625, a report transmission manager 630, a rake receiver configuration reception manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The request reception manager 625 is capable of, configured to, or operable to support a means for receiving, from a network entity, a request to provide a report indicative of one or more capability parameters associated with a rake receiver of the UE. The report transmission manager 630 is capable of, configured to, or operable to support a means for transmitting, to the network entity, the report based on the one or more capability parameters. The rake receiver configuration reception manager 635 is capable of, configured to, or operable to support a means for receiving, from the network entity, signaling indicating a configuration to be applied to the rake receiver based on the report.

Figure 7:
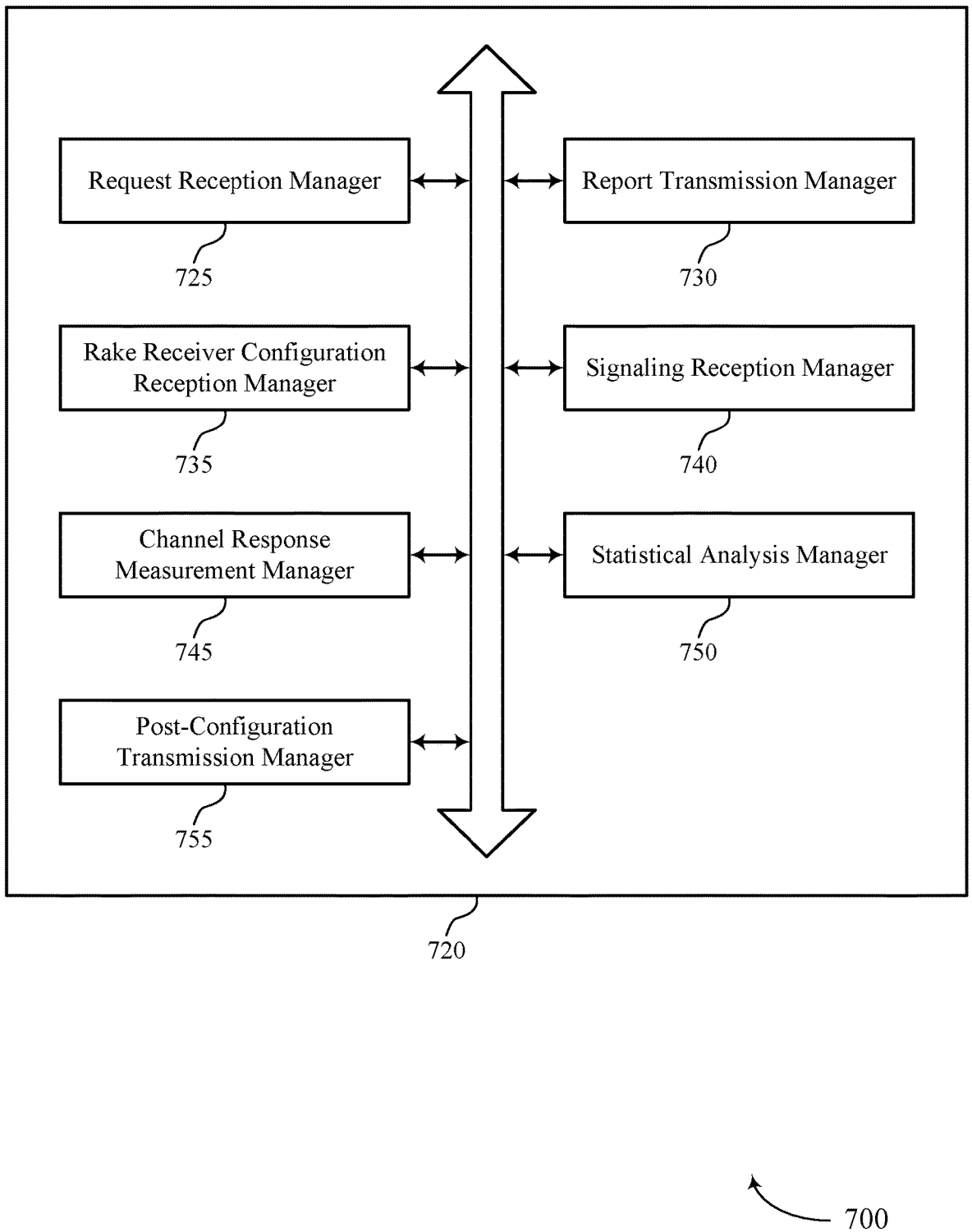
FIG. 7 shows a block diagram of a communications manager that supports UE reporting for a rake receiver configuration and setting transmission parameters in accordance with one or more aspects of the present disclosure.

FIG. 7 shows a block diagram 700 of a communications manager 720 that supports UE reporting for a rake receiver configuration and setting transmission parameters in accordance with one or more aspects of the present disclosure. The communications manager 720 may be an example of aspects of a communications manager 520, a communications manager 620, or both, as described herein. The communications manager 720, or various components thereof, may be an example of means for performing various aspects of UE reporting for a rake receiver configuration and setting transmission parameters as described herein. For example, the communications manager 720 may include a request reception manager 725, a report transmission manager 730, a rake receiver configuration reception manager 735, a signaling reception manager 740, a channel response measurement manager 745, a statistical analysis manager 750, a post-configuration transmission manager 755, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The request reception manager 725 is capable of, configured to, or operable to support a means for receiving, from a network entity, a request to provide a report indicative of one or more capability parameters associated with a rake receiver of the UE. The report transmission manager 730 is capable of, configured to, or operable to support a means for transmitting, to the network entity, the report based on the one or more capability parameters. The rake receiver configuration reception manager 735 is capable of, configured to, or operable to support a means for receiving, from the network entity, signaling indicating a configuration to be applied to the rake receiver based on the report.

In some examples, the one or more capability parameters are indicative of a maximum quantity of taps supported by the rake receiver.

In some examples, to support one or more capability parameters associated with the rake receiver, the rake receiver configuration reception manager 735 is capable of, configured to, or operable to support a means for a quantity of sub-receivers of the rake receiver, a type of the rake receiver, a power consumption level associated with each of the sub-receivers, or any combination thereof.

In some examples, the rake receiver configuration reception manager 735 is capable of, configured to, or operable to support a means for receiving, from the network entity, an indication of a set of multiple thresholds, each of the set of multiple thresholds associated with activating a respective sub-receiver for a respective channel tap.

In some examples, to support receiving, from the network entity, the signaling indicating the configuration, the signaling reception manager 740 is capable of, configured to, or operable to support a means for receiving, from the network entity, the configuration in an RRC signal, a medium access control (MAC) control element (MAC-CE) signal, a DCI signal, or any combination thereof.

In some examples, to support receiving, from the network entity, the signaling indicating the configuration, the rake receiver configuration reception manager 735 is capable of, configured to, or operable to support a means for receiving, from the network entity, the configuration according to a periodic reception pattern or a non-periodic reception pattern.

In some examples, the channel response measurement manager 745 is capable of, configured to, or operable to support a means for measuring, one or more channel response parameters associated with the rake receiver, the channel response parameters based on the configuration applied to the rake receiver. In some examples, the statistical analysis manager 750 is capable of, configured to, or operable to support a means for performing a statistical analysis on the one or more channel response parameters. In some examples, the post-configuration transmission manager 755 is capable of, configured to, or operable to support a means for transmitting, to the network entity, an indication of a post-configuration response based at least part on the statistical analysis on the one or more channel response parameters.

In some examples, the rake receiver configuration reception manager 735 is capable of, configured to, or operable to support a means for receiving, from the network entity, signaling indicating a set of multiple coefficients, each of the set of multiple coefficients to be applied to a respective sub-receiver of a set of multiple sub-receivers of the rake receiver.

Figure 8:
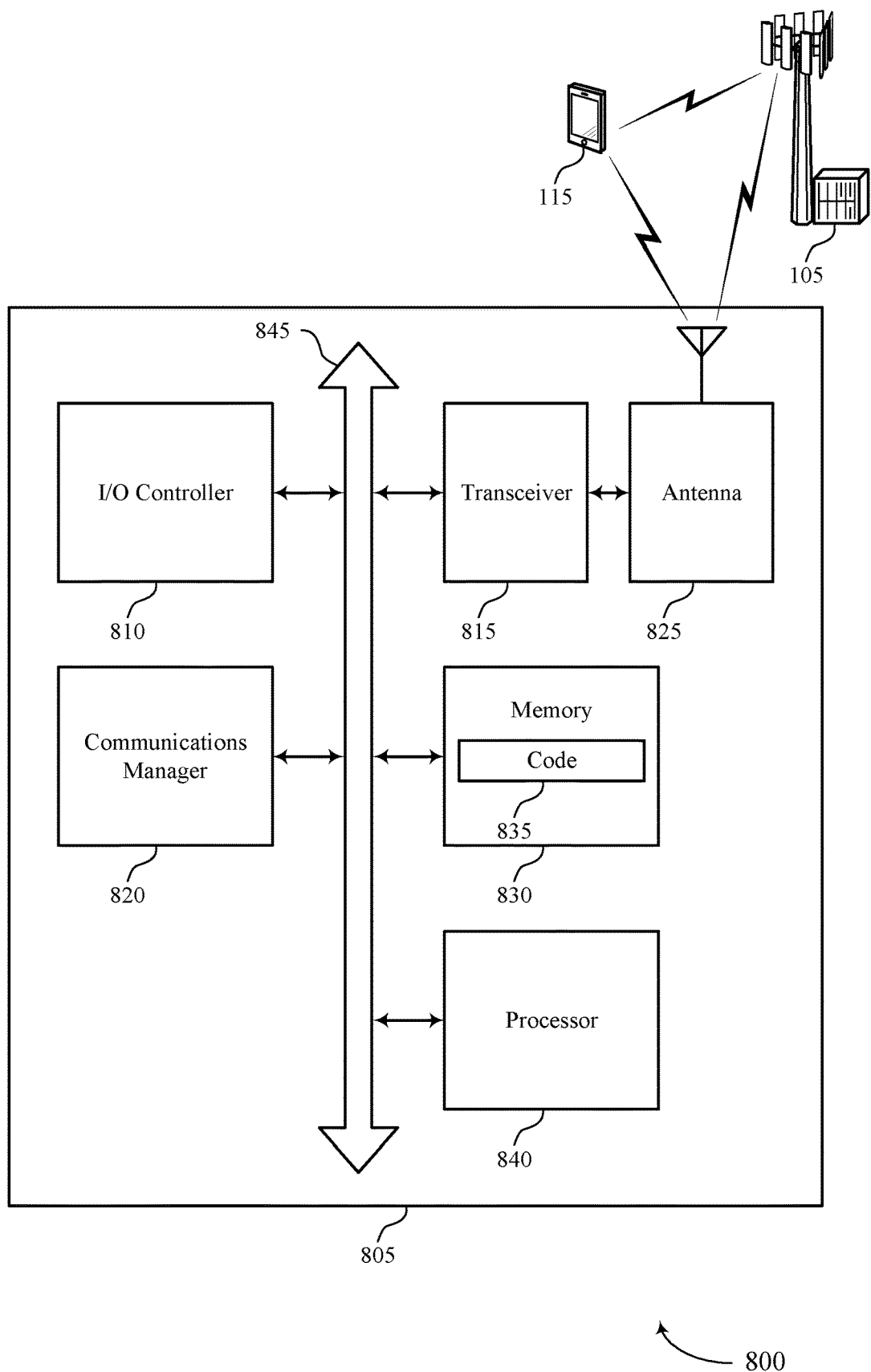
FIG. 8 shows a diagram of a system including a device that supports UE reporting for a rake receiver configuration and setting transmission parameters in accordance with one or more aspects of the present disclosure.

FIG. 8 shows a diagram of a system 800 including a device 805 that supports UE reporting for a rake receiver configuration and setting transmission parameters in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting UE reporting for a rake receiver configuration and setting transmission parameters). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communication in accordance with examples as disclosed herein. For example, the communications manager 820 is capable of, configured to, or operable to support a means for receiving, from a network entity, a request to provide a report indicative of one or more capability parameters associated with a rake receiver of the UE. The communications manager 820 is capable of, configured to, or operable to support a means for transmitting, to the network entity, the report based on the one or more capability parameters. The communications manager 820 is capable of, configured to, or operable to support a means for receiving, from the network entity, signaling indicating a configuration to be applied to the rake receiver based on the report.

By including or configuring the communications manager 820 in accordance with examples as described herein, the device 805 may support techniques for reducing complex processing performed at the UE 115 in order to reduce power consumption at the UE 115.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described herein with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of UE reporting for a rake receiver configuration and setting transmission parameters as described herein, or the at least one processor 840 and the at least one memory 830 may be otherwise configured to, individually or collectively, perform or support such operations.

Figure 9:
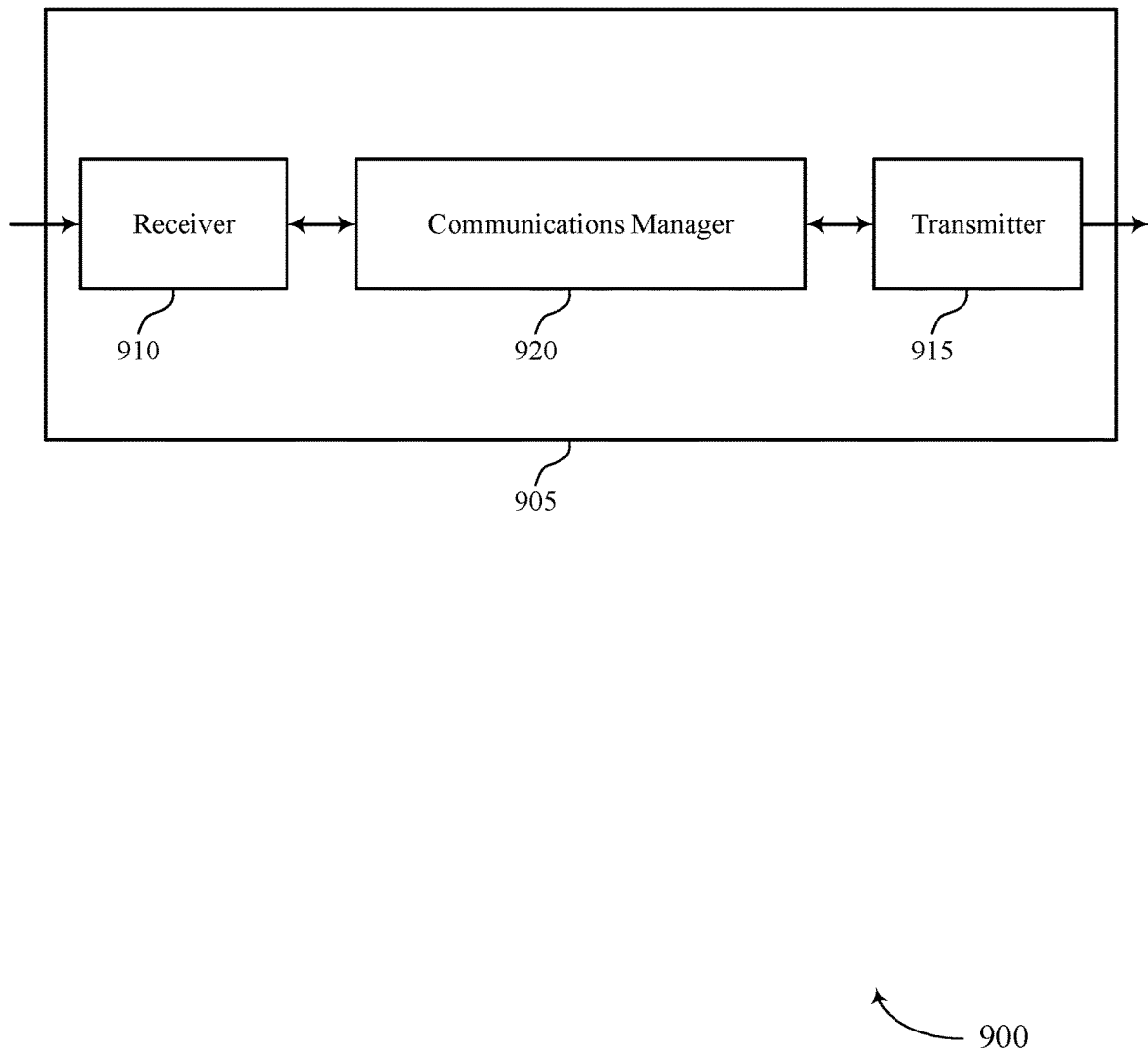
FIGS. 9 and 10 show block diagrams of devices that support UE reporting for a rake receiver configuration and setting transmission parameters in accordance with one or more aspects of the present disclosure.

FIG. 9 shows a block diagram 900 of a device 905 that supports UE reporting for a rake receiver configuration and setting transmission parameters in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor (not shown), which may be coupled with at least one memory (not shown), to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of UE reporting for a rake receiver configuration and setting transmission parameters as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for transmitting, to a UE, a request to provide a report indicative of one or more capability parameters associated with a rake receiver of the UE. The communications manager 920 is capable of, configured to, or operable to support a means for receiving, from the UE, the report based on the one or more capability parameters. The communications manager 920 is capable of, configured to, or operable to support a means for transmitting, to the UE, signaling indicating a configuration to be applied to the rake receiver based on the report.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reducing complex processing performed at the UE 115 in order to reduce power consumption at the UE 115.

Figure 10:
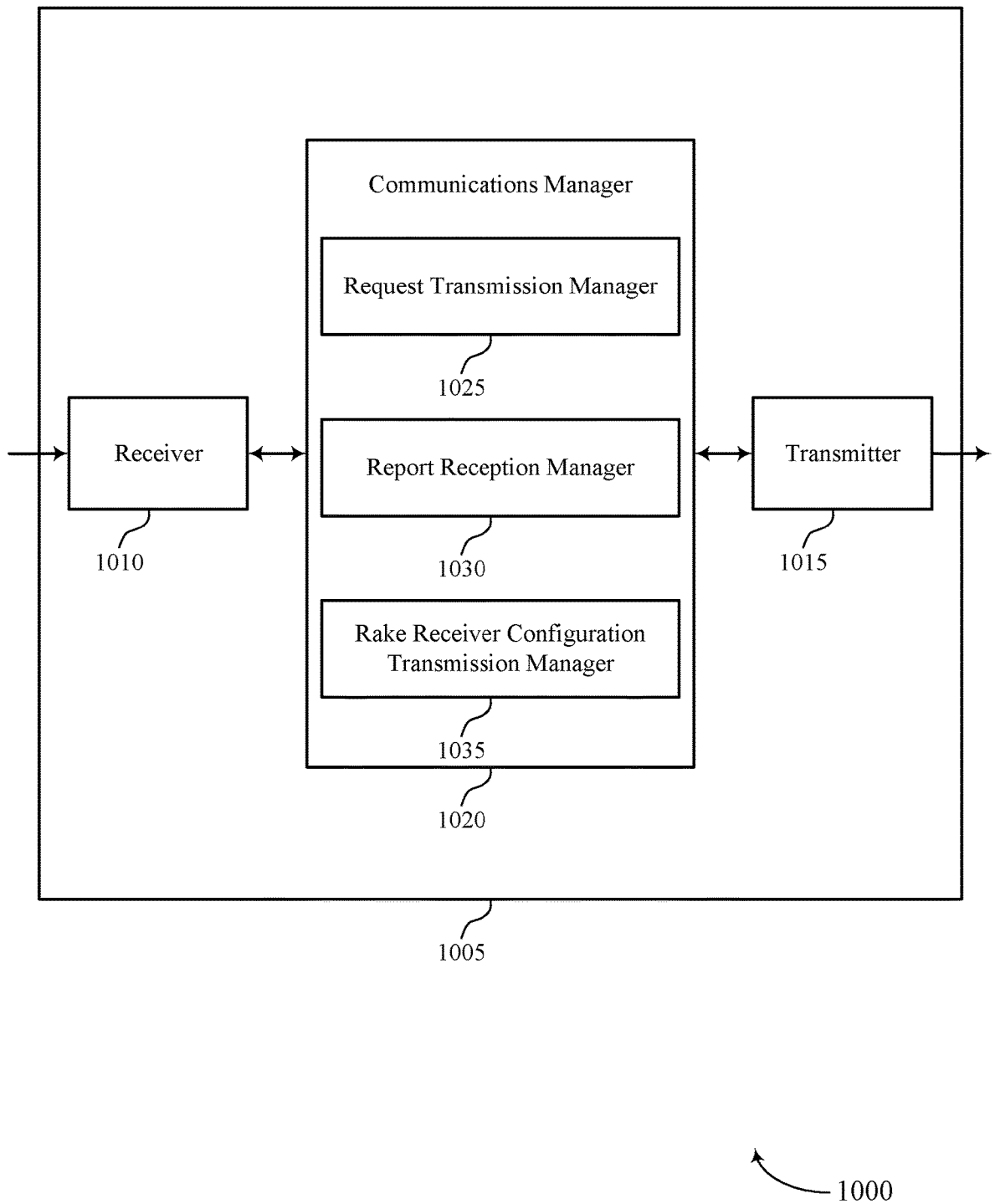

FIG. 10 shows a block diagram 1000 of a device 1005 that supports UE reporting for a rake receiver configuration and setting transmission parameters in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor (not shown), which may be coupled with at least one memory (not shown), to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of UE reporting for a rake receiver configuration and setting transmission parameters as described herein. For example, the communications manager 1020 may include a request transmission manager 1025, a report reception manager 1030, a rake receiver configuration transmission manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The request transmission manager 1025 is capable of, configured to, or operable to support a means for transmitting, to a UE, a request to provide a report indicative of one or more capability parameters associated with a rake receiver of the UE. The report reception manager 1030 is capable of, configured to, or operable to support a means for receiving, from the UE, the report based on the one or more capability parameters. The rake receiver configuration transmission manager 1035 is capable of, configured to, or operable to support a means for transmitting, to the UE, signaling indicating a configuration to be applied to the rake receiver based on the report.

Figure 11:
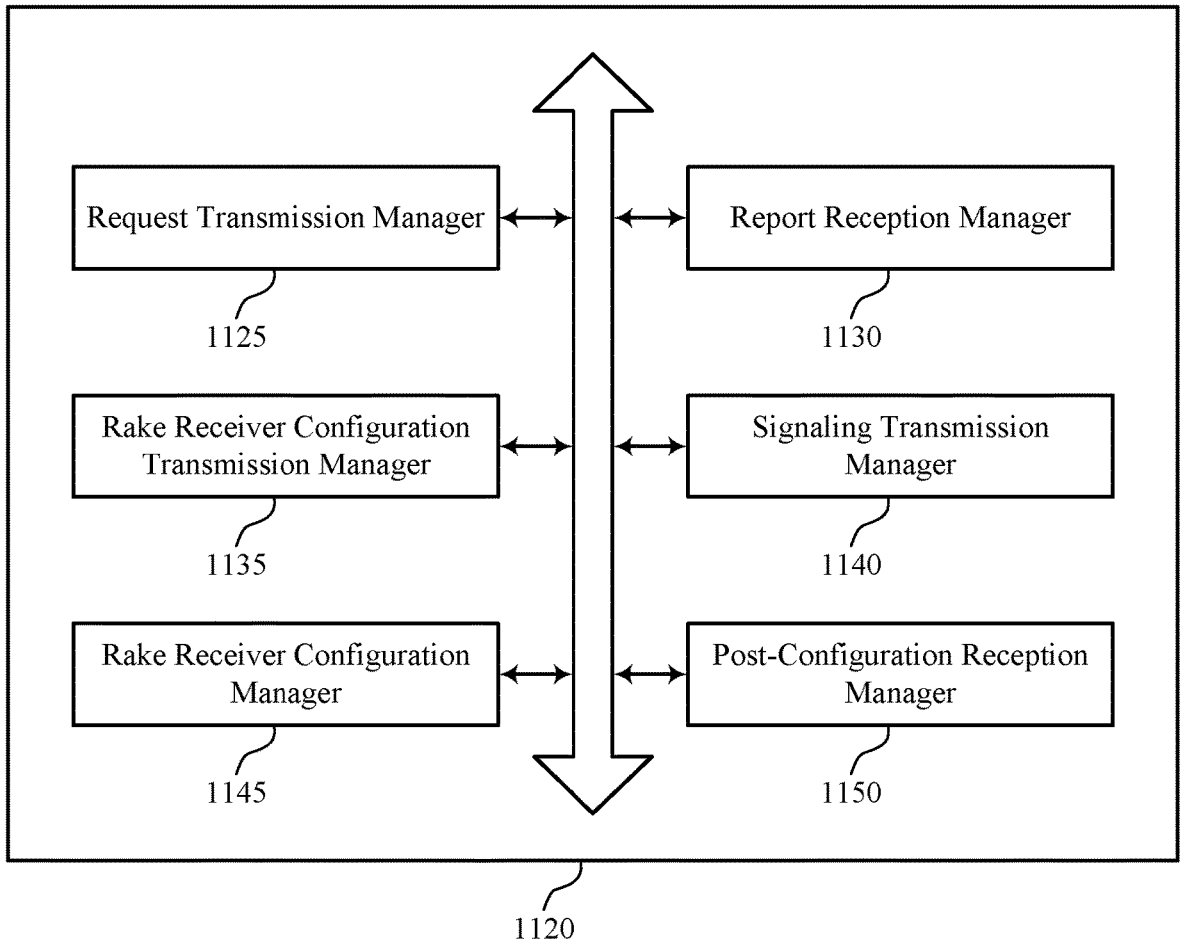
FIG. 11 shows a block diagram of a communications manager that supports UE reporting for a rake receiver configuration and setting transmission parameters in accordance with one or more aspects of the present disclosure.

FIG. 11 shows a block diagram 1100 of a communications manager 1120 that supports UE reporting for a rake receiver configuration and setting transmission parameters in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of UE reporting for a rake receiver configuration and setting transmission parameters as described herein. For example, the communications manager 1120 may include a request transmission manager 1125, a report reception manager 1130, a rake receiver configuration transmission manager 1135, a signaling transmission manager 1140, a rake receiver configuration manager 1145, a post-configuration reception manager 1150, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The request transmission manager 1125 is capable of, configured to, or operable to support a means for transmitting, to a UE, a request to provide a report indicative of one or more capability parameters associated with a rake receiver of the UE. The report reception manager 1130 is capable of, configured to, or operable to support a means for receiving, from the UE, the report based on the one or more capability parameters. The rake receiver configuration transmission manager 1135 is capable of, configured to, or operable to support a means for transmitting, to the UE, signaling indicating a configuration to be applied to the rake receiver based on the report.

In some examples, the one or more capability parameters are indicative of a maximum quantity of taps supported by the rake receiver.

In some examples, to support one or more capability parameters associated with the rake receiver, the rake receiver configuration transmission manager 1135 is capable of, configured to, or operable to support a means for a quantity of sub-receivers of the rake receiver, a type of the rake receiver, a power consumption level associated with each of the sub-receivers, or any combination thereof.

In some examples, the rake receiver configuration transmission manager 1135 is capable of, configured to, or operable to support a means for transmitting, to the UE, an indication of a set of multiple thresholds, each of the set of multiple thresholds associated with activating a respective sub-receiver for a respective channel tap.

In some examples, to support transmitting, to the UE, the signaling indicating the configuration, the signaling transmission manager 1140 is capable of, configured to, or operable to support a means for transmitting, from the network entity, the configuration in an RRC signal, a medium access control (MAC) control element (MAC-CE) signal, a DCI signal, or any combination thereof.

In some examples, to support transmitting, to the UE, the configuration, the rake receiver configuration manager 1145 is capable of, configured to, or operable to support a means for transmitting, to the UE, the signaling indicating the configuration according to a periodic reception pattern or a non-periodic reception pattern.

In some examples, the post-configuration reception manager 1150 is capable of, configured to, or operable to support a means for receiving, from the UE, an indication of a post-configuration response based at least part on a statistical analysis on one or more channel response parameters associated with the rake receiver, the channel response parameters based on the configuration applied to the rake receiver.

In some examples, the rake receiver configuration transmission manager 1135 is capable of, configured to, or operable to support a means for transmitting, to the UE, signaling indicating a set of multiple coefficients, each of the set of multiple coefficients to be applied to a respective sub-receiver of a set of multiple sub-receivers of the rake receiver.

Figure 12:
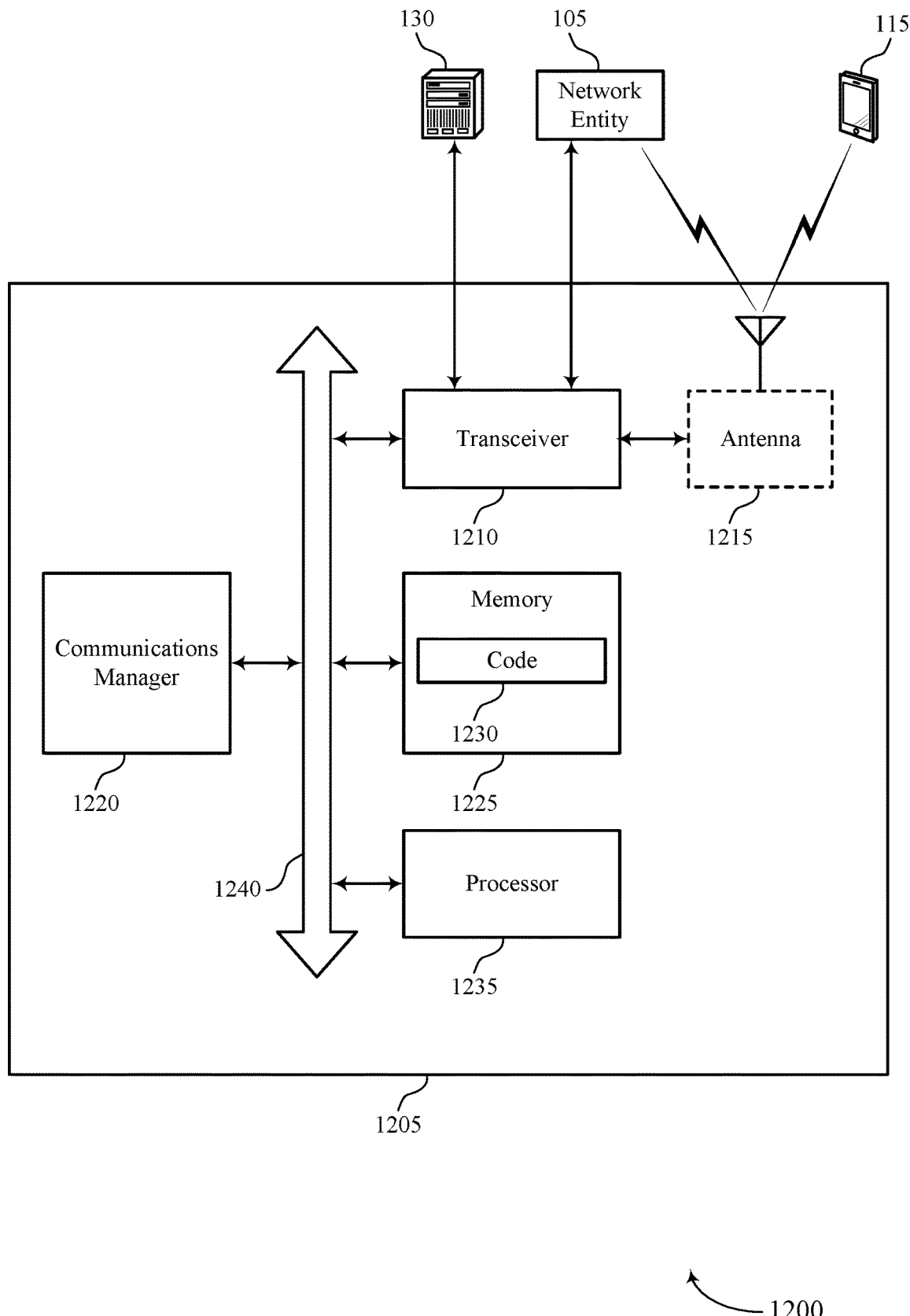
FIG. 12 shows a diagram of a system including a device that supports UE reporting for a rake receiver configuration and setting transmission parameters in accordance with one or more aspects of the present disclosure.

FIG. 12 shows a diagram of a system 1200 including a device 1205 that supports UE reporting for a rake receiver configuration and setting transmission parameters in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components (not shown) that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting UE reporting for a rake receiver configuration and setting transmission parameters). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with ULEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for transmitting, to a UE, a request to provide a report indicative of one or more capability parameters associated with a rake receiver of the UE. The communications manager 1220 is capable of, configured to, or operable to support a means for receiving, from the UE, the report based on the one or more capability parameters. The communications manager 1220 is capable of, configured to, or operable to support a means for transmitting, to the UE, signaling indicating a configuration to be applied to the rake receiver based on the report.

By including or configuring the communications manager 1220 in accordance with examples as described herein, the device 1205 may support techniques for reducing complex processing performed at the UE 115 in order to reduce power consumption at the UE 115.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described herein with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of UE reporting for a rake receiver configuration and setting transmission parameters as described herein, or the at least one processor 1235 and the at least one memory 1225 may be otherwise configured to, individually or collectively, perform or support such operations.

Figure 13:
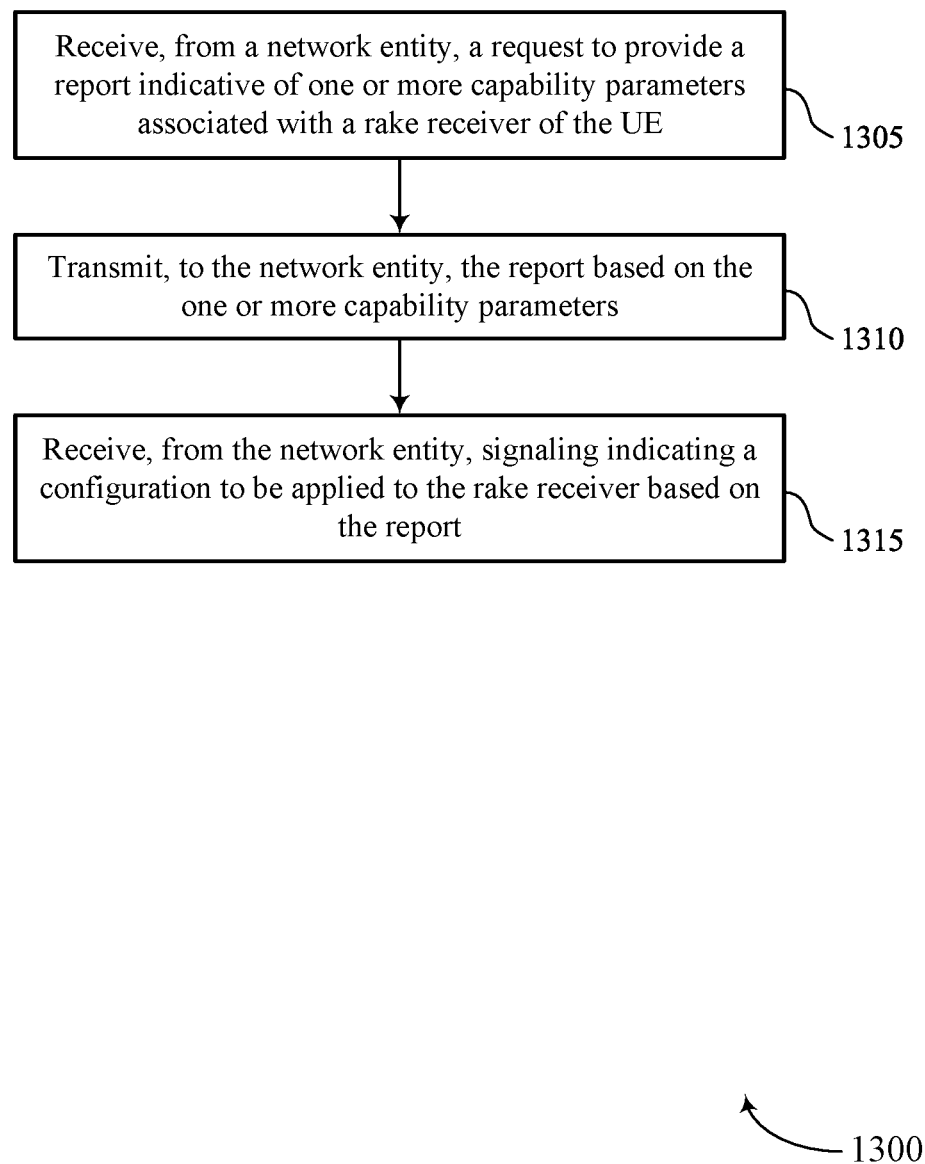
FIGS. 13 through 15 show flowcharts illustrating methods that support UE reporting for a rake receiver configuration and setting transmission parameters in accordance with one or more aspects of the present disclosure.

FIG. 13 shows a flowchart illustrating a method 1300 that supports UE reporting for a rake receiver configuration and setting transmission parameters in accordance with aspects of the present disclosure. The operations of the method 1300 may be implemented by a UE or its components as described herein. For example, the operations of the method 1300 may be performed by a UE 115 as described herein with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity 105, a request to provide a report indicative of one or more capability parameters associated with a rake receiver of the UE 115. The operations of block 1305 may be performed in accordance with examples as disclosed herein. In some examples, aspects of the operations of 1305 may be performed by a request reception manager 725 as described herein with reference to FIG. 7.

At 1310, the method may include transmitting, to the network entity 105, the report based on the one or more capability parameters. The operations of block 1310 may be performed in accordance with examples as disclosed herein. In some examples, aspects of the operations of 1310 may be performed by a report transmission manager 730 as described herein with reference to FIG. 7.

At 1315, the method may include receiving, from the network entity 105, signaling indicating a configuration to be applied to the rake receiver based on the report. The operations of block 1315 may be performed in accordance with examples as disclosed herein. In some examples, aspects of the operations of 1315 may be performed by a rake receiver configuration reception manager 735 as described herein with reference to FIG. 7.

Figure 14:
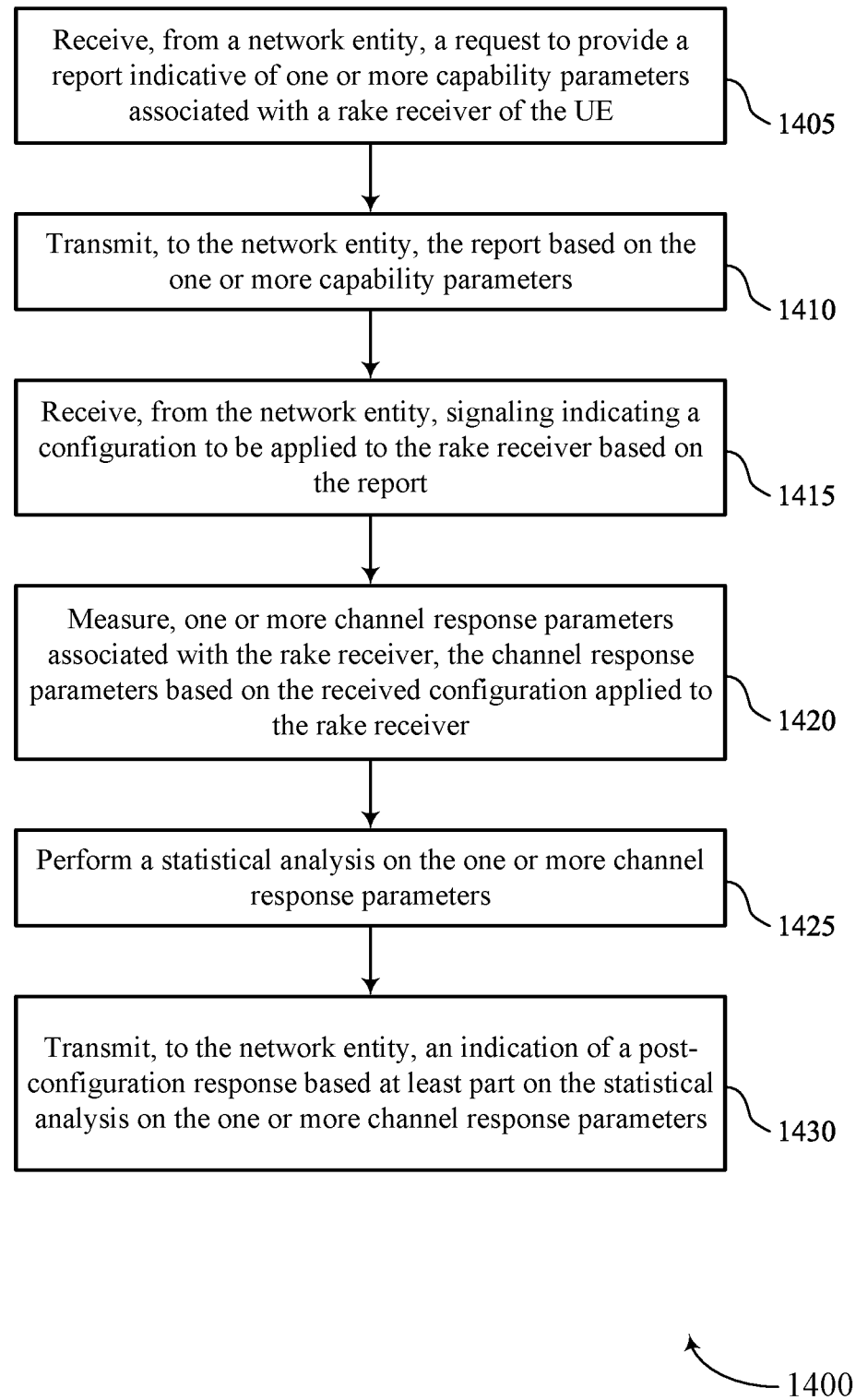

FIG. 14 shows a flowchart illustrating a method 1400 that supports UE 115 reporting for a rake receiver configuration and setting transmission parameters in accordance with aspects of the present disclosure. The operations of the method 1400 may be implemented by a UE 115 or its components as described herein. For example, the operations of the method 1400 may be performed by a UE 115 as described herein with reference to FIGS. 1 through 8. In some examples, a UE may execute a set of instructions to control the functional elements of the UE to perform the described functions. Additionally, or alternatively, the UE 115 may perform aspects of the described functions using special-purpose hardware.

At 1405, the method may include receiving, from a network entity 105, a request to provide a report indicative of one or more capability parameters associated with a rake receiver of the UE 115. The operations of block 1405 may be performed in accordance with examples as disclosed herein. In some examples, aspects of the operations of 1405 may be performed by a request reception manager 725 as described herein with reference to FIG. 7.

At 1410, the method may include transmitting, to the network entity 105, the report based on the one or more capability parameters. The operations of block 1410 may be performed in accordance with examples as disclosed herein. In some examples, aspects of the operations of 1410 may be performed by a report transmission manager 730 as described herein with reference to FIG. 7.

At 1415, the method may include receiving, from the network entity 105, signaling indicating a configuration to be applied to the rake receiver based on the report. The operations of block 1415 may be performed in accordance with examples as disclosed herein. In some examples, aspects of the operations of 1415 may be performed by a rake receiver configuration reception manager 735 as described herein with reference to FIG. 7.

At 1420, the method may include measuring, one or more channel response parameters associated with the rake receiver, the channel response parameters based on the configuration applied to the rake receiver. The operations of block 1420 may be performed in accordance with examples as disclosed herein. In some examples, aspects of the operations of 1420 may be performed by a channel response measurement manager 745 as described herein with reference to FIG. 7.

At 1425, the method may include performing a statistical analysis on the one or more channel response parameters. The operations of block 1425 may be performed in accordance with examples as disclosed herein. In some examples, aspects of the operations of 1425 may be performed by a statistical analysis manager 750 as described herein with reference to FIG. 7.

At 1430, the method may include transmitting, to the network entity 105, an indication of a post-configuration response based at least part on the statistical analysis on the one or more channel response parameters. The operations of block 1430 may be performed in accordance with examples as disclosed herein. In some examples, aspects of the operations of 1430 may be performed by a post-configuration transmission manager 755 as described herein with reference to FIG. 7.

Figure 15:
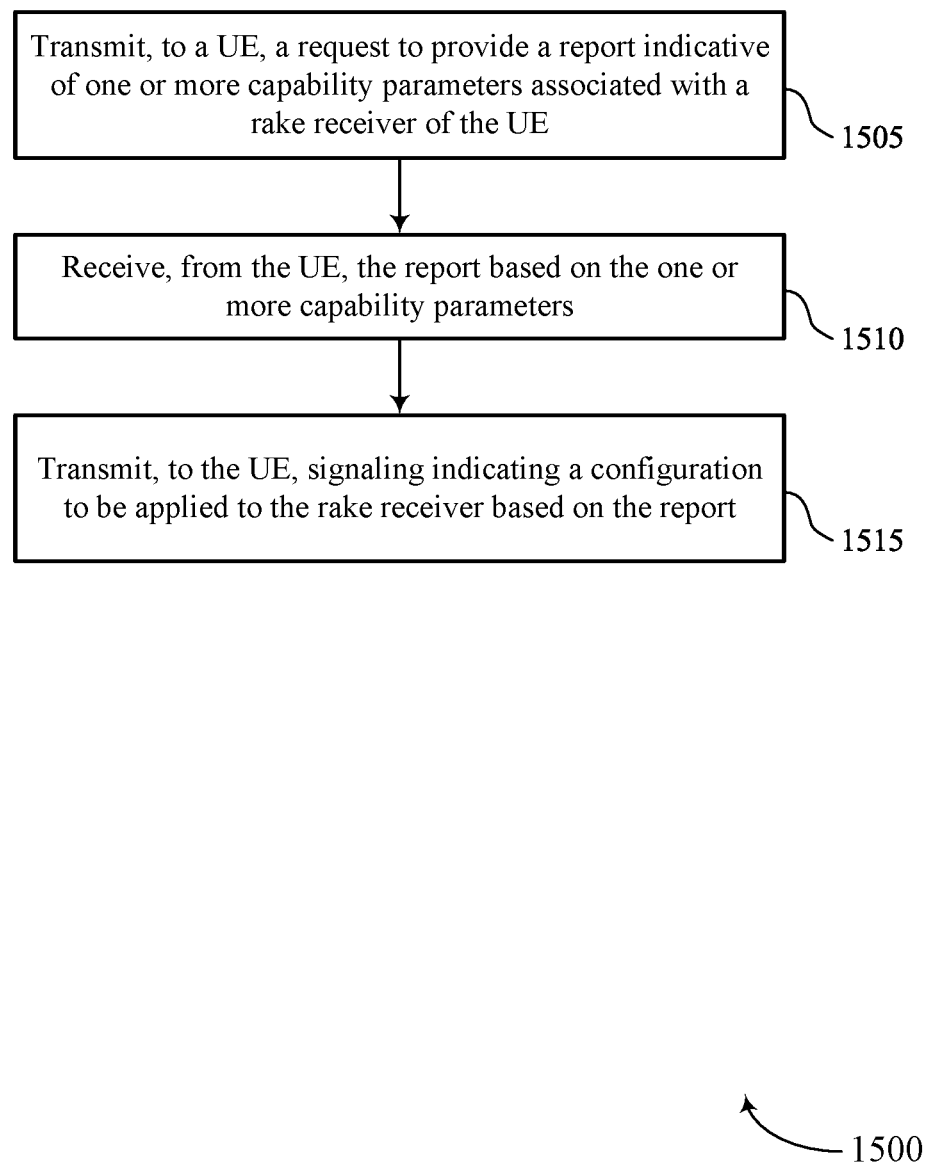

FIG. 15 shows a flowchart illustrating a method 1500 that supports UE 115 reporting for a rake receiver configuration and setting transmission parameters in accordance with aspects of the present disclosure. The operations of the method 1500 may be implemented by a network entity or its components as described herein. For example, the operations of the method 1500 may be performed by a network entity as described herein with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE 115, a request to provide a report indicative of one or more capability parameters associated with a rake receiver of the UE 115. The operations of block 1505 may be performed in accordance with examples as disclosed herein. In some examples, aspects of the operations of 1505 may be performed by a request transmission manager 1125 as described herein with reference to FIG. 11.

At 1510, the method may include receiving, from the UE 115, the report based on the one or more capability parameters. The operations of block 1510 may be performed in accordance with examples as disclosed herein. In some examples, aspects of the operations of 1510 may be performed by a report reception manager 1130 as described herein with reference to FIG. 11.

At 1515, the method may include transmitting, to the UE 115, signaling indicating a configuration to be applied to the rake receiver based on the report. The operations of block 1515 may be performed in accordance with examples as disclosed herein. In some examples, aspects of the operations of 1515 may be performed by a rake receiver configuration transmission manager 1135 as described herein with reference to FIG. 11.

The following provides an overview of aspects of the present disclosure:

Aspect 1: A method for wireless communication at a UE, comprising: receiving, from a network entity, a request to provide a report indicative of one or more capability parameters associated with a rake receiver of the UE; transmitting, to the network entity, the report based at least in part on the one or more capability parameters; and receiving, from the network entity, signaling indicating a configuration to be applied to the rake receiver based at least in part on the report.

Aspect 2: The method of aspect 1, wherein the one or more capability parameters are indicative of a maximum quantity of taps supported by the rake receiver.

Aspect 3: The method of any of aspects 1 through 2, wherein the one or more capability parameters associated with the rake receiver comprises: a quantity of sub-receivers of the rake receiver, a type of the rake receiver, a power consumption level associated with each of the sub-receivers, or any combination thereof.

Aspect 4: The method of any of aspects 1 through 3, comprising: receiving, from the network entity, an indication of a plurality of thresholds, each of the plurality of thresholds associated with activating a respective sub-receiver for a respective channel tap.

Aspect 5: The method of any of aspects 1 through 4, wherein receiving, from the network entity, the signaling indicating the configuration, comprises: receiving, from the network entity, the configuration in an RRC signal, a MAC-CE signal, a DCI signal, or any combination thereof.

Aspect 6: The method of any of aspects 1 through 5, wherein receiving, from the network entity, the signaling indicating the configuration, comprises: receiving, from the network entity, the configuration according to a periodic reception pattern or a non-periodic reception pattern.

Aspect 7: The method of any of aspects 1 through 6, comprising: measuring, one or more channel response parameters associated with the rake receiver, the channel response parameters based at least in part on the configuration applied to the rake receiver; performing a statistical analysis on the one or more channel response parameters; and transmitting, to the network entity, an indication of a post-configuration response based at least part on the statistical analysis on the one or more channel response parameters.

Aspect 8: The method of any of aspects 1 through 7, comprising: receiving, from the network entity, signaling indicating a plurality of coefficients, each of the plurality of coefficients to be applied to a respective sub-receiver of a plurality of sub-receivers of the rake receiver.

Aspect 9: A method for wireless communication at a network entity, comprising: transmitting, to a UE, a request to provide a report indicative of one or more capability parameters associated with a rake receiver of the UE; receiving, from the UE, the report based at least in part on the one or more capability parameters; and transmitting, to the UE, signaling indicating a configuration to be applied to the rake receiver based at least in part on the report.

Aspect 10: The method of aspect 9, wherein the one or more capability parameters are indicative of a maximum quantity of taps supported by the rake receiver.

Aspect 11: The method of any of aspects 9 through 10, wherein the one or more capability parameters associated with the rake receiver comprises: a quantity of sub-receivers of the rake receiver, a type of the rake receiver, a power consumption level associated with each of the sub-receivers, or any combination thereof.

Aspect 12: The method of any of aspects 9 through 11, comprising: transmitting, to the UE, an indication of a plurality of thresholds, each of the plurality of thresholds associated with activating a respective sub-receiver for a respective channel tap.

Aspect 13: The method of any of aspects 9 through 12, wherein transmitting, to the UE, the signaling indicating the configuration, comprises: transmitting, from the network entity, the configuration in an RRC signal, a MAC-CE signal, a DCI signal, or any combination thereof.

Aspect 14: The method of any of aspects 9 through 13, wherein transmitting, to the UE, the configuration, comprises: transmitting, to the UE, the signaling indicating the configuration according to a periodic reception pattern or a non-periodic reception pattern.

Aspect 15: The method of any of aspects 9 through 14, comprising: receiving, from the UE, an indication of a post-configuration response based at least part on a statistical analysis on one or more channel response parameters associated with the rake receiver, the channel response parameters based at least in part on the configuration applied to the rake receiver.

Aspect 16: The method of any of aspects 9 through 15, comprising: transmitting, to the UE, signaling indicating a plurality of coefficients, each of the plurality of coefficients to be applied to a respective sub-receiver of a plurality of sub-receivers of the rake receiver Aspect 17: A UE for wireless communication, comprising one or more memories storing processor-executable code, and one or more processors coupled with the one or more memories and individually or collectively operable to execute the code to cause the UE to perform a method of any of aspects 1 through 8.

Aspect 18: A UE for wireless communication, comprising at least one means for performing a method of any of aspects 1 through 8.

Aspect 19: A non-transitory computer-readable medium storing code for wireless communication, the code comprising instructions executable by a processor to perform a method of any of aspects 1 through 8.

Aspect 20: A network entity for wireless communication, comprising one or more memories storing processor-executable code, and one or more processors coupled with the one or more memories and individually or collectively operable to execute the code to cause the network entity to perform a method of any of aspects 9 through 16.

Aspect 21: A network entity for wireless communication, comprising at least one means for performing a method of any of aspects 9 through 16.

Aspect 22: A non-transitory computer-readable medium storing code for wireless communication, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor:
   at least one memory coupled with the at least one processor, with instructions stored in the at least one memory, the instructions being executable by the at least one processor, individually or in any combination, to cause the apparatus to:
      receive, from a network entity, a request to provide a report indicative of one or more capability parameters associated with a rake receiver of the UE;
      transmit, to the network entity, the report based at least in part on the one or more capability parameters; and
      receive, from the network entity, signaling indicating a configuration to be applied to the rake receiver based at least in part on the transmitted report.

2. The apparatus of claim 1, wherein the one or more capability parameters are indicative of a maximum quantity of taps supported by the rake receiver.

3. The apparatus of claim 1, wherein the one or more capability parameters associated with the rake receiver comprises:
   a quantity of sub-receivers of the rake receiver, a type of the rake receiver, a power consumption level associate with each of the sub-receivers, or any combination thereof.

4. The apparatus of claim 1, wherein the instructions being executable by the at least one processor, individually or in any combination, cause the apparatus to:
   receive, from the network entity, an indication of a plurality of thresholds, each of the plurality of thresholds associated with activating a respective sub-receiver for a respective channel tap.

5. The apparatus of claim 1, wherein, to receive, from the network entity, the signaling indicating the configuration, the instructions being executable by the at least one processor, individually or in any combination, cause the apparatus to:
   receive, from the network entity, the configuration in a radio resource control (RRC) signal, a medium access control (MAC) control element (MAC-CE) signal, a downlink control information (DCI) signal, or any combination thereof.

6. The apparatus of claim 1, wherein, to receive, from the network entity, the signaling indicating the configuration, the instructions being executable by the at least one processor, individually or in any combination, cause the apparatus to:
   receive, from the network entity, the configuration according to a periodic reception pattern or a non-periodic reception pattern.

7. The apparatus of claim 1, wherein the instructions being executable by the at least one processor, individually or in any combination, cause the apparatus to:
   measure, one or more channel response parameters associated with the rake receiver, the one or more channel response parameters based at least in part on the configuration applied to the rake receiver;
   perform a statistical analysis on the one or more channel response parameters; and
   transmit, to the network entity, an indication of a post-configuration response based at least part on the statistical analysis on the one or more channel response parameters.

8. The apparatus of claim 1, wherein the instructions being executable by the at least one processor, individually or in any combination, cause the apparatus to:
   receive, from the network entity, signaling indicating a plurality of coefficients, each of the plurality of coefficients to be applied to a respective sub-receiver of a plurality of sub-receivers of the rake receiver.

9. An apparatus for wireless communications at a network entity, comprising:
   at least one processor; and
   at least one memory coupled with the at least one processor, with instructions stored in the at least one memory, the instructions being executable by the at least one processor, individually or in any combination, to cause the apparatus to:
      transmit, to a user equipment (UE), a request to provide a report indicative of one or more capability parameters associated with a rake receiver of the UE;
      receive, from the UE, the report based at least in part on the one or more capability parameters; and
      transmit, to the UE, signaling indicating a configuration to be applied to the rake receiver based at least in part on the received report.

10. The apparatus of claim 9, wherein the one or more capability parameters are indicative of a maximum quantity of taps supported by the rake receiver.

11. The apparatus of claim 9, wherein the one or more capability parameters associated with the rake receiver comprises:
   a quantity of sub-receivers of the rake receiver, a type of the rake receiver, a power consumption level associate with each of the sub-receivers, or any combination thereof.

12. The apparatus of claim 9, wherein the instructions being executable by the at least one processor, individually or in any combination, cause the apparatus to:
   transmit, to the UE, an indication of a plurality of thresholds, each of the plurality of thresholds associated with activating a respective sub-receiver for a respective channel tap.

13. The apparatus of claim 9, wherein, to transmit, to the UE, the signaling indicating the configuration, the instructions being executable by the at least one processor, individually or in any combination, cause the apparatus to:

transmit, from the network entity, the configuration in a radio resource control (RRC) signal, a medium access control (MAC) control element (MAC-CE) signal, a downlink control information (DCI) signal, or any combination thereof.

14. The apparatus of claim 9, wherein, to transmit, to the UE, the configuration, the instructions being executable by the at least one processor, individually or in any combination, cause the apparatus to:

transmit, to the UE, the signaling indicating the configuration according to a periodic reception pattern or a non-periodic reception pattern.

15. The apparatus of claim 9, wherein, to transmit, to the UE, the configuration, the instructions being executable by the at least one processor, individually or in any combination, cause the apparatus to:

receive, from the UE, an indication of a post-configuration response based at least part on a statistical analysis on one or more channel response parameters associated with the rake receiver, the one or more channel response parameters based at least in part on the configuration applied to the rake receiver.

16. The apparatus of claim 9, wherein, to transmit, to the UE, the configuration, the instructions being executable by the at least one processor, individually or in any combination, cause the apparatus to:

transmit, to the UE, signaling indicating a plurality of coefficients, each of the plurality of coefficients to be applied to a respective sub-receiver of a plurality of sub-receivers of the rake receiver.

17. A method for wireless communication at a user equipment (UE), comprising:

receiving, from a network entity, a request to provide a report indicative of one or more capability parameters associated with a rake receiver of the UE;

transmitting, to the network entity, the report based at least in part on the one or more capability parameters; and receiving, from the network entity, signaling indicating a configuration to be applied to the rake receiver based at least in part on the transmitted report.

18. The method of claim 17, wherein the one or more capability parameters are indicative of a maximum quantity of taps supported by the rake receiver.

19. The method of claim 17, wherein the one or more capability parameters associated with the rake receiver comprises:

a quantity of sub-receivers of the rake receiver, a type of the rake receiver, a power consumption level associated with each of the sub-receivers, or any combination thereof.

20. The method of claim 17, comprising:

receiving, from the network entity, an indication of a plurality of thresholds, each of the plurality of thresholds associated with activating a respective sub-receiver for a respective channel tap.

21. The method of claim 17, wherein receiving, from the network entity, the signaling indicating the configuration, comprises:

receiving, from the network entity, the configuration in a radio resource control (RRC) signal, a medium access control (MAC) control element (MAC-CE) signal, a downlink control information (DCI) signal, or any combination thereof.

22. The method of claim 17, wherein receiving, from the network entity, the signaling indicating the configuration, comprises:

receiving, from the network entity, the configuration according to a periodic reception pattern or a non-periodic reception pattern.

23. The method of claim 17, comprising:

measuring, one or more channel response parameters associated with the rake receiver, the one or more channel response parameters based at least in part on the configuration applied to the rake receiver;

performing a statistical analysis on the one or more channel response parameters; and transmitting, to the network entity, an indication of a post-configuration response based at least part on the statistical analysis on the one or more channel response parameters.

24. The method of claim 17, comprising:

receiving, from the network entity, signaling indicating a plurality of coefficients, each of the plurality of coefficients to be applied to a respective sub-receiver of a plurality of sub-receivers of the rake receiver.

25. A method for wireless communication at a network entity, comprising:

transmitting, to a user equipment (UE), a request to provide a report indicative of one or more capability parameters associated with a rake receiver of the UE;

receiving, from the UE, the report based at least in part on the one or more capability parameters; and transmitting, to the UE, signaling indicating a configuration to be applied to the rake receiver based at least in part on the received report.

26. The method of claim 25, wherein the one or more capability parameters are indicative of a maximum quantity of taps supported by the rake receiver.

27. The method of claim 25, wherein the one or more capability parameters associated with the rake receiver comprises:

a quantity of sub-receivers of the rake receiver, a type of the rake receiver, a power consumption level associated with each of the sub-receivers, or any combination thereof.

28. The method of claim 25, comprising:

transmitting, to the UE, an indication of a plurality of thresholds, each of the plurality of thresholds associated with activating a respective sub-receiver for a respective channel tap.

29. The method of claim 25, wherein transmitting, to the UE, the signaling indicating the configuration, comprises:

transmitting, from the network entity, the configuration in a radio resource control (RRC) signal, a medium access control (MAC) control element (MAC-CE) signal, a downlink control information (DCI) signal, or any combination thereof.

30. The method of claim 25, wherein transmitting, to the UE, the configuration, comprises:

transmitting, to the UE, the signaling indicating the configuration according to a periodic reception pattern or a non-periodic reception pattern.

\* \* \* \* \*